(12) United States Patent
Kang et al.

(10) Patent No.: US 11,243,784 B2
(45) Date of Patent: Feb. 8, 2022

(54) METHOD FOR MANAGING TRIGGER, AND TERMINAL DEVICE

(71) Applicant: HUAWEI TECHNOLOGIES CO., LTD., Guangdong (CN)

(72) Inventors: Zhi Kang, Hangzhou (CN); Qiulin Chen, Shanghai (CN); Zhenkun Zhou, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 67 days.

(21) Appl. No.: 16/749,953

(22) Filed: Jan. 22, 2020

(65) Prior Publication Data

US 2020/0192682 A1    Jun. 18, 2020

Related U.S. Application Data

(63) Continuation of application No. PCT/CN2018/083104, filed on Apr. 13, 2018.

(30) Foreign Application Priority Data

Jul. 28, 2017   (CN) .......................... 201710630643.8

(51) Int. Cl.
*G06F 9/445* (2018.01)
*G06F 9/48* (2006.01)
(Continued)

(52) U.S. Cl.
CPC ........ *G06F 9/44505* (2013.01); *G06F 9/4843* (2013.01); *G06F 9/5044* (2013.01); *G06F 9/542* (2013.01)

(58) Field of Classification Search
CPC .................................................. G06F 9/44505
See application file for complete search history.

(56) References Cited

U.S. PATENT DOCUMENTS 9,516,127 B2    12/2016  Nirantar et al.
2013/0316716 A1*  11/2013  Tapia ................... H04W 72/048
                                                                455/450
2014/0289745 A1   9/2014  Nirantar

FOREIGN PATENT DOCUMENTS

CN    103294512 A    9/2013
CN    103823711 A    5/2014
(Continued)

*Primary Examiner* — Charlie Sun
(74) *Attorney, Agent, or Firm* — Womble Bond Dickinson (US) LLP

(57) ABSTRACT

A method for managing a trigger on a terminal device, and a terminal device are provided. In response to an operation (S301) of setting a trigger by an application program (181), a trigger manager (235) determines a triggering policy of the trigger based on a use habit of a user, characteristic information of the trigger, and characteristic information of the application program. The triggering policy is accelerating triggering, normal triggering, or delaying triggering. Different triggering policies are executed for triggers having different characteristics, to dynamically change timings for the triggers to trigger scheduled tasks. In this way, a malicious trigger configured to keep an application alive or trigger a task that does not match a true will of the user is prevented to reduce resource consumption, and a trigger beneficial to a system or the user can be triggered earlier to improve user experience.

18 Claims, 14 Drawing Sheets

(51) Int. Cl.
*G06F 9/50* (2006.01)
*G06F 9/54* (2006.01)

(56) References Cited

FOREIGN PATENT DOCUMENTS

| | | |
|---|---|---|
| CN | 104021019 A | 9/2014 |
| CN | 105955444 A | 9/2016 |
| CN | 106774786 A | 5/2017 |

\* cited by examiner

METHOD FOR MANAGING TRIGGER, AND TERMINAL DEVICE

CROSS-REFERENCE TO RELATED APPLICATIONS

This application is a continuation of International Application No. PCT/CN2018/083104, filed on Apr. 13, 2018, which claims priority to Chinese Patent Application No. 201710630643.8, filed on Jul. 28, 2017. The disclosures of the aforementioned applications are hereby incorporated by reference in their entireties.

TECHNICAL FIELD

This application relates to the field of terminals, and more specifically, to a method for managing a trigger on a terminal device, and a terminal device.

BACKGROUND

A terminal device usually senses a change and elapsing of time according to a requirement of an application program, to trigger a corresponding task. For example, the terminal device may trigger a corresponding task at a specified time by using a trigger such as an alarm, a job information (JobInfo) object, or a timer. Triggers may be set to trigger tasks at specified times for a plurality of reasons. Some triggers are set according to an actual requirement of a user, while some triggers are autonomously set by an application program.

A good-will trigger can improve user experience. For example, a user operates in an alarm, and sets the alarm to ring at 7:00 tomorrow morning, to wake up the user to work. Alternatively, a user performs a setting in a shopping application program to snap up an item, and the shopping application program accordingly sets a reminder alarm with a corresponding time. Alternatively, a system application program or a common application program needs to complete a particular task. For example, a news application program may set a JobInfo object that is triggered once an hour to obtain and cache news on the Internet, so that a user waits less time.

However, from a perspective of an application program, to ensure a target quantity of daily active users, ensure advertising revenue, increase a quantity of users online at the same time, decrease a cold start rate, or the like, the application program may apply some special mechanisms for malicious keepalive, to ensure that the application program resides in background and a resource is not cleaned up by a system. Currently, a most widely used means is: The application program automatically starts at a specified time or periodically by setting a trigger without knowledge of a user. In this way, even though the application program is closed by the user, the application program can still be pulled up in background by the trigger. It is found through testing and analysis that, many common application programs on the terminal device automatically start at specified times or periodically by using triggers, for example, alarms or JobInfo objects, of an operating system, to achieve keepalive. Such a trigger that is set to keep an application program alive does not match a true will or intention of a user, and usually is not perceived by the user, and therefore may also be referred to as a malicious trigger. The malicious trigger causes the system to repeatedly pull up, in background, the application program that has been closed by the user. This leads to additional resource overheads (CPU, memory, battery, and the like), degrades foreground performance, and increases power consumption. In addition, when the terminal device is in a sleep state, the malicious trigger that is set by the application program repeatedly wakes up the system from the sleep state, leading to additional power consumption, and affecting battery endurance of the terminal device.

SUMMARY

This application provides a method for managing a trigger, and a related apparatus, to differently manage and control triggers on a terminal device based on information in one or more dimensions, to change a timing for an application program to execute a corresponding task based on a trigger, prevent behavior of setting the trigger by the application program to frequently trigger the task, and reduce resource consumption.

According to a first aspect, an embodiment of this application provides a method for managing a trigger, including: obtaining a trigger that is set by an application program on a terminal device, where the trigger is set to trigger a scheduled task at a specified triggering time; determining an attribute of the trigger based on at least one of characteristic information of historical behavior of a user, characteristic information of the application program, or characteristic information of the trigger; and delaying or stopping the trigger based on the attribute of the trigger, so that the scheduled task is triggered at a time later than the triggering time that is set by the application program, where the characteristic information of the historical behavior of the user is used to determine a use habit of the user. In this solution, a trigger that does not match a will of the user or the use habit of the user and that has a particular attribute, for example, a malicious trigger configured to keep an application alive (periodically start a process or a service), is identified based on the use habit of the user, a characteristic of the application program, and a characteristic of the trigger, and the trigger is delayed or stopped. This reduces impact on foreground available resources, and reduces power consumption.

The trigger is an alarm, a timer, or a job information (JobInfo) object.

In one embodiment, when it is determined, based on at least one of the characteristic information of the historical behavior of the user, the characteristic information of the application program, or the characteristic information of the trigger, that the trigger is a trigger that is configured to trigger a task specified by the user or beneficial to user experience and that has a particular attribute, the trigger is accelerated to trigger the corresponding task earlier or in an unstopped manner, to improve user experience.

In one embodiment, when the triggering time of the trigger arrives, before the trigger is delivered, whether a delivering condition is met is further determined based on at least one of a status of the terminal device or a current operation status of the user. If the delivering condition is not met, delivering the trigger to the application program is delayed. In this way, triggering behavior of the trigger can be managed and controlled better, to reduce impact on foreground performance and improve user experience.

In one embodiment, a plurality of different types of trigger queues may be set, including: a normal trigger queue, a delayed trigger queue, and an accelerated trigger queue. Correspondingly, a trigger whose triggering policy is delaying triggering is added to the delayed trigger queue, a trigger whose triggering policy is normal triggering is added to the normal trigger queue, and a trigger whose triggering policy is accelerating triggering is added to the accelerated trigger queue. A plurality of trigger queues corresponding to a plurality of triggering policies are set to facilitate logical management on triggers and improve system performance.

In one embodiment, the trigger may be migrated between different trigger queues based on a delivering timing of the trigger.

According to a second aspect, an embodiment of this application provides another method for managing a trigger, including: determining a trigger that is set by a first application program on a terminal device, where the trigger is configured to: when a specified triggering condition is met, trigger the first application program to execute a scheduled task; determining a triggering policy of the trigger based on at least one of characteristic information of historical behavior of a user, characteristic information of the application program, or characteristic information of the trigger; and if the triggering policy of the trigger is normal triggering, when the specified triggering condition is met, executing the trigger to trigger the application program to execute the scheduled task; or if the triggering policy of the trigger is delaying triggering, delaying the trigger to trigger the application program later to execute the scheduled task. In this solution, the triggering policy of the trigger that is set by the application program is dynamically determined based on a use habit of the user, a characteristic of the application program, and a characteristic of the trigger, and a trigger having a particular attribute, for example, a malicious trigger, is delayed or stopped. This reduces impact of the malicious trigger on foreground available resources, and reduces power consumption.

In one embodiment, a trigger that is configured to trigger a task specified by the user or beneficial to user experience and that has a particular attribute may be identified based on at least one of the characteristic information of the historical behavior of the user, the characteristic information of the application program, or the characteristic information of the trigger, and the trigger is accelerated to trigger the corresponding task earlier or in an unstopped manner, to improve user experience.

In one embodiment, when the triggering condition of the trigger is met, whether a delivering condition is met is further determined based on at least one of a status of the terminal device or a current operation status of the user. If the delivering condition is met, the trigger is delivered to the first application program. If the delivering condition is not met, delivering the trigger to the application program is delayed. In this way, triggering behavior of the trigger can be managed and controlled better, to reduce impact on foreground performance and improve user experience.

In one embodiment, the trigger may be delayed and accelerated by modifying the triggering condition of the trigger.

The triggering condition of the trigger includes a condition in a time dimension and/or a condition in the terminal device status dimension. The condition in the time dimension includes, but is not limited to, a time for triggering the scheduled task, a time interval for triggering the scheduled task, or a maximum triggering delay of the scheduled task. The condition in the terminal device status dimension includes, but is not limited to, a battery level of the terminal device is not lower than a specified first threshold, available storage space of the terminal device is not less than a specified second threshold, the terminal device is in a charging state, the terminal device is in an idle mode, or a network connection type of the terminal device is a specified type.

In one embodiment, the delaying the trigger includes: when the triggering condition that is set by the application program is met, waiting preset duration and then determining again whether the specified triggering condition is met, and if the specified triggering condition is met, executing the trigger to trigger the application program to execute the scheduled task. The preset duration may be flexibly set based on a status of a system or a specific application scenario.

In one embodiment, a plurality of different types of trigger queues may be set, including: a normal trigger queue, a delayed trigger queue, and an accelerated trigger queue. Correspondingly, a trigger whose triggering policy is delaying triggering is added to the delayed trigger queue, a trigger whose triggering policy is normal triggering is added to the normal trigger queue, and a trigger whose triggering policy is accelerating triggering is added to the accelerated trigger queue. A plurality of trigger queues corresponding to a plurality of triggering policies are set to facilitate logical management on triggers and improve system performance.

According to a third aspect, an embodiment of this application provides another method for managing a trigger, including: determining a trigger that is set by an application program on a terminal device, where the trigger is configured to: when a specified triggering condition is met, trigger the application program to execute a scheduled task; and when the triggering condition of the trigger is met, delaying, based on at least one of a status of the terminal device or a current operation status of a user, delivering the trigger to the application program, so that the scheduled task is executed later. In this solution, a delivering timing of the trigger is flexibly managed and controlled based on the status of the terminal device and/or the current operation status of the user, to reduce impact of the trigger on foreground performance and improve user experience.

The triggering condition of the trigger includes a condition in a time dimension and/or a condition in the terminal device status dimension. The condition in the time dimension includes, but is not limited to, a time for triggering the scheduled task, a time interval for triggering the scheduled task, or a maximum triggering delay of the scheduled task. The condition in the terminal device status dimension includes, but is not limited to, a battery level of the terminal device is not lower than a specified first threshold, available storage space of the terminal device is not less than a specified second threshold, the terminal device is in a charging state, the terminal device is in an idle mode, or a network connection type of the terminal device is a specified type.

In one embodiment, when resource usage of the terminal device exceeds a specified threshold, delivering the trigger to the application program is delayed.

In one embodiment, when the terminal device is in a sleep mode, delivering the trigger to the application program is delayed.

In one embodiment, when a battery level of the terminal device is lower than a predetermined threshold, delivering the trigger to the application program is delayed.

In one embodiment, when a foreground application currently operated by the user is a high-resource-consumption application, in other words, consumed resources exceed a preset threshold, for example, the application is a large-scale game, delivering the trigger to the application program is delayed.

According to a fourth aspect, an embodiment of this application provides another method for managing a trigger, including: obtaining a parameter of a trigger, where the trigger is set by an application program on a terminal device to trigger, when a specified triggering condition is met, a scheduled task to be executed; determining a triggering policy of the trigger based on at least one of the parameter of the trigger, characteristic information of historical behavior of a user, or characteristic information of the application program; and if the triggering policy of the trigger is normal triggering, when the specified triggering condition is met, executing the trigger to trigger the application program to execute the scheduled task; or if the triggering policy of the trigger is delaying triggering, delaying the trigger to trigger the application program later to execute the scheduled task. In this solution, the triggering policy of the trigger that is set by the application program is dynamically determined based on a use habit of the user, a characteristic of the application program, and a characteristic of the trigger, and a trigger having a particular attribute, for example, a malicious trigger, is delayed or stopped. This reduces impact of the malicious trigger on foreground available resources, and reduces power consumption.

The parameter of the trigger includes: a type, the triggering condition, the to-be-triggered scheduled task (scheduled task), and the like of the trigger.

In one embodiment, a trigger that is configured to trigger a task specified by the user or beneficial to user experience and that has a particular attribute may be identified based on at least one of the parameter of the trigger, the characteristic information of the historical behavior of the user, or the characteristic information of the application program, and the trigger is accelerated to trigger the corresponding task earlier or in an unstopped manner, to improve user experience.

In one embodiment, when the triggering condition of the trigger is met, whether a delivering condition is met is further determined based on at least one of a status of the terminal device or a current operation status of the user. If the delivering condition is met, the trigger is delivered to the application program. If the delivering condition is not met, delivering the trigger to the application program is delayed. In this way, triggering behavior of the trigger can be managed and controlled better, to reduce impact on foreground performance and improve user experience.

In one embodiment, the trigger may be delayed and accelerated by modifying the triggering condition of the trigger.

In one embodiment, the delaying the trigger includes: when the triggering condition that is set by the application program is met, waiting preset duration and then determining again whether the specified triggering condition is met, and if the specified triggering condition is met, executing the trigger to trigger the application program to execute the scheduled task. The preset duration may be flexibly set based on a status of a system or a specific application scenario.

In one embodiment, a plurality of different types of trigger queues may be set, including: a normal trigger queue, a delayed trigger queue, and an accelerated trigger queue. Correspondingly, a trigger whose triggering policy is delaying triggering is added to the delayed trigger queue, a trigger whose triggering policy is normal triggering is added to the normal trigger queue, and a trigger whose triggering policy is accelerating triggering is added to the accelerated trigger queue. A plurality of trigger queues corresponding to a plurality of triggering policies are set to facilitate logical management on triggers and improve system performance.

According to a fifth aspect, an embodiment of this application provides a terminal device, including one or more functional units configured to perform the method described in any one of the first aspect to the fourth aspect. These functional units may be implemented by software, or implemented by hardware, for example, a processor, or implemented by software and necessary hardware.

According to a sixth aspect, an embodiment of this application provides a terminal device, including: a memory, a processor, and a computer program that is stored in the memory. When the processor executes the computer program, operations of the method described in any one of the first aspect to the fourth aspect are implemented.

According to a seventh aspect, an embodiment of this application provides a computer-readable storage medium, storing a computer program (an instruction). When the program is executed by a processor, operations of the method described in any one of the first aspect to the fourth aspect are implemented.

In any one of the foregoing aspects or the possible implementations of the foregoing aspects, the characteristic information of the application program includes at least one of characteristic information of historical behavior, an identifier, or a type of the application program; and the characteristic information of the historical behavior of the user includes an operation record of the user and/or a whitelist that is set by the user, and the whitelist records an identifier, set by the user, of a trusted application program.

In any one of the foregoing aspects or the possible implementations of the foregoing aspects, the status of the terminal device includes at least one of resource usage, a battery level, a work mode, a network connection status, a data transmission status, a name of a foreground application program, a type of the foreground application program, a name of a background application program, or a type of the background application program of the terminal device; and the work mode of the terminal device includes a sleep mode and a wakeup mode.

In any one of the foregoing aspects or the possible implementations of the foregoing aspects, the scheduled task that the trigger triggers to be executed includes at least one of the following: starting an activity, sending a broadcast, starting a service, or initiating network communication.

In any one of the foregoing aspects or the possible implementations of the foregoing aspects, the characteristic information of the trigger includes at least one of a type (for example, a one-time trigger or a repeating trigger), a triggering condition, or a to-be-triggered task of the trigger; the characteristic information of the application program includes at least one of a name/an identifier of the application program, a type of the application program, or characteristic information of historical behavior of the application program; and the characteristic information of the historical behavior of the user includes at least one of a frequency, a time, a location, or a motion status when the user uses each application.

DESCRIPTION OF DRAWINGS

To describe the technical solutions in the embodiments of this application more clearly, the following briefly describes accompanying drawings required for describing the embodiments of this application.

DESCRIPTION OF EMBODIMENTS

Figure 1:
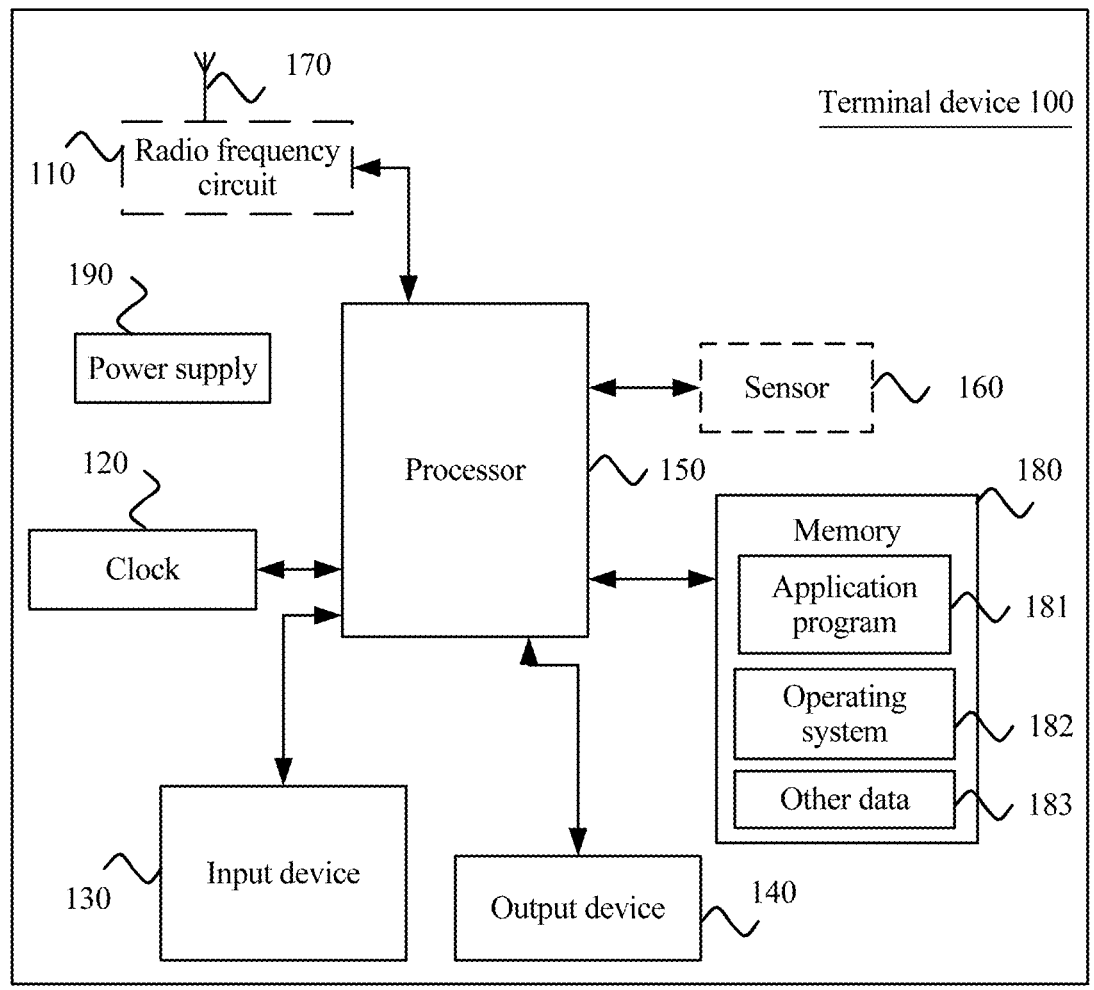
FIG. 1 is a schematic structural diagram of a terminal device according to an embodiment of this application.

The following describes in detail the technical solutions in the embodiments of this application with reference to the accompanying drawings in the embodiments of this application. Apparently, the described embodiments are merely some rather than all of the embodiments of this application.

A method provided in the embodiments of this application is used to manage a trigger that is set by an application program on a terminal device, to dynamically change a timing for the trigger to trigger the application program to execute a scheduled task. The terminal device is a device that provides voice and/or data connectivity for a user, and is a wireless terminal or a wired terminal. The wireless terminal may be a handheld device with a wireless connection function, or another processing device connected to a wireless modem, or a mobile terminal that communicates with one or more core networks through a radio access network. For example, the wireless terminal may be a mobile phone (also referred to as a "cellular" phone) or a computer with a mobile terminal. For another example, the wireless terminal may be a portable, pocket-sized, handheld, computer built-in, or in-vehicle mobile apparatus. For still another example, the wireless terminal may be a part of a mobile station (MS), an access point (AP), or user equipment (UE). In the specification, claims, and accompanying drawings of this application, the term "trigger" is a logical function that is set by an application program to trigger a scheduled task by using an external event when a specified triggering condition is met. The triggering condition of the trigger may be a condition in a time dimension, for example, a triggering time or a time interval. The triggering time of the trigger is a particular time point, that is, a moment or a timing for triggering the scheduled task. The time interval is a time interval for repeatedly triggering the scheduled task. Alternatively, the triggering condition may be a condition in another dimension related to a status of the terminal device, for example, a remaining resource quantity or a work mode of the terminal device. It may be understood that, the triggering condition of the trigger may alternatively include both a condition in a time dimension and a condition in a terminal device status dimension. For example, a trigger triggers, at an interval of two hours when the terminal device is idle or being charged, a corresponding task to be executed. The trigger on the terminal device usually includes an alarm or a timer that is configured to trigger a scheduled task at a specified time or periodically, or a job information (JobInfo) object that triggers a task based on a specified condition. It can be learned that, a trigger includes characteristic information in at least two dimensions: a triggering condition and a scheduled task. The scheduled task is a task that waits to be triggered by the trigger. The triggering condition is a condition that needs to be met to trigger the scheduled task, for example, a timing for triggering the task. The triggering condition and the scheduled task of the trigger are set by an application program. The trigger supports a one-time timed task and a cyclic timed task. When the trigger is set to trigger the one-time timed task, the triggering condition of the trigger includes a triggering time. When the trigger is set to trigger the cyclic timed task, the triggering condition of the trigger further includes a time interval or a period for triggering the task. It should be understood that, in addition to the terminal device, the method provided in the embodiments of this application may be further applied to another type of computer system.

FIG. 1 is a schematic structural diagram of a terminal device according to an embodiment of this application. As shown in FIG. 1, the terminal device 100 includes a processor 150, a memory 180, an input device 130, and an output device 140. The memory 180 stores a computer program or an instruction. The computer program includes an operating system 182, an application program 181, and the like. The processor 150 is configured to execute the computer program in the memory 180, to implement a method defined by the computer program. For example, the processor 150 executes the operating system 182 to implement various functions of the operating system 182 on the terminal device 100.

The processor 150 may include one or more processors. For example, the processor 150 may include one or more application processors, or include an application processor and a baseband processor. When the processor 150 includes a plurality of processors, the plurality of processors may be integrated on a same chip, or each may be independent chips. One processor may include one or more processing cores.

The memory 180 further stores other data 183 in addition to the computer program. The other data 183 may include data that is generated after the operating system 182 or the application program 181 is run, and the data includes system data (for example, a configuration parameter of the operating system) and user data.

The memory 180 usually includes a memory and an external storage. The memory includes, but is not limited to, a random access memory (RAM), a read-only memory (ROM), a cache, or the like. The external storage includes, but is not limited to, a flash memory, a hard disk, an optic disc, a universal serial bus (USB) disk, a floppy disk, a tape drive, or the like. The computer program is usually stored in the external storage. Before executing the computer program, the processor loads the program from the external storage to the memory.

In an embodiment, the operating system 182 includes a computer program used to implement a method for managing a trigger provided in the embodiments of this application, so that after the processor 150 runs the operating system 182, operations of the method for managing a trigger provided in the embodiments of this application are implemented.

The input device 130 is configured to receive information input by a user, for example, digit/character information, a touch operation, or a gesture, and generate a corresponding input signal. Specifically, in an embodiment, the input device 130 includes a touch panel. The touch panel, also referred to as a touchscreen, may collect a touch operation of the user on the touch panel, and generate a touch signal to drive a related component to respond to the operation of the user. The touch panel may include a touch detection apparatus and a touch controller. The touch detection apparatus detects a touch orientation of the user, and transfers a signal corresponding to the touch operation to the touch controller. The touch controller receives the touch signal from the touch detection apparatus, converts the touch signal into contact coordinates, and then sends the contact coordinates to the processor 150 for processing. In addition to the touch panel, the input device 130 may further include other input devices. The other input devices include, but are not limited to, one or more of a physical keyboard, a functional button (for example, a volume control button or a switch button), a trackball, a mouse, a joystick, and the like.

The output device 140 may include an audio output device such as a speaker, and a display device. The display device may be a liquid crystal display (LCD) or an organic light-emitting diode (OLED) display panel. In some embodiments, the touch panel may cover the display device to form a touch display.

In addition, the terminal device 100 further includes a clock 120 configured to provide a precise real time or a time standard, and a power supply 190 configured to supply power to other modules. The clock 120 may be a real-time clock (RTC). The RTC is an electronic device that can output an actual time like a clock, and usually includes an integrated circuit, and therefore is also referred to as a clock chip. The clock 120 usually uses a quartz crystal resonator as a clock frequency source of the clock 120. If the quartz crystal resonator is used, most resonators have a frequency the same as that of a resonator in a quartz clock, that is, 32.768 kHz. The clock 120 may be powered by a backup battery. Therefore, even though the power supply 190 is disabled, the clock 120 can still work. In an embodiment, the clock 120 includes: a timekeeper and a timer. The timekeeper mainly implements a timekeeping function of writing a current time, for example, second, minute, hour, date, week, month, and year, to a timekeeping register in real time in a format of a binary-coded decimal (BCD) code. The timer also has a corresponding register: a timing register, configured to store a triggering time. When a value of the timekeeping register increases to a value of the timing register, in other words, the triggering time arrives, the timer generates an interrupt. After sensing the interrupt, the operating system 182 performs a corresponding operation.

In one embodiment, when the terminal device 100 is a wireless terminal, the terminal device 100 further includes a radio frequency circuit 110 and an antenna 170. Correspondingly, the processor 150 includes at least one baseband processor. The baseband processor, the radio frequency circuit 110, and the antenna 170 cooperatively implement radio signal receiving and sending functions, for example, modulation and demodulation, signal amplification and filtering, and equalization.

In one embodiment, the terminal device 100 further includes one or more sensors 160, for example, an acceleration sensor or an optical sensor.

The method for managing a trigger provided in the embodiments of this application may be performed by a proper combination of software, hardware, and/or firmware of the terminal device 100, for example, may be implemented by the operating system 182 shown in FIG. 1 and necessary hardware.

Figure 2:
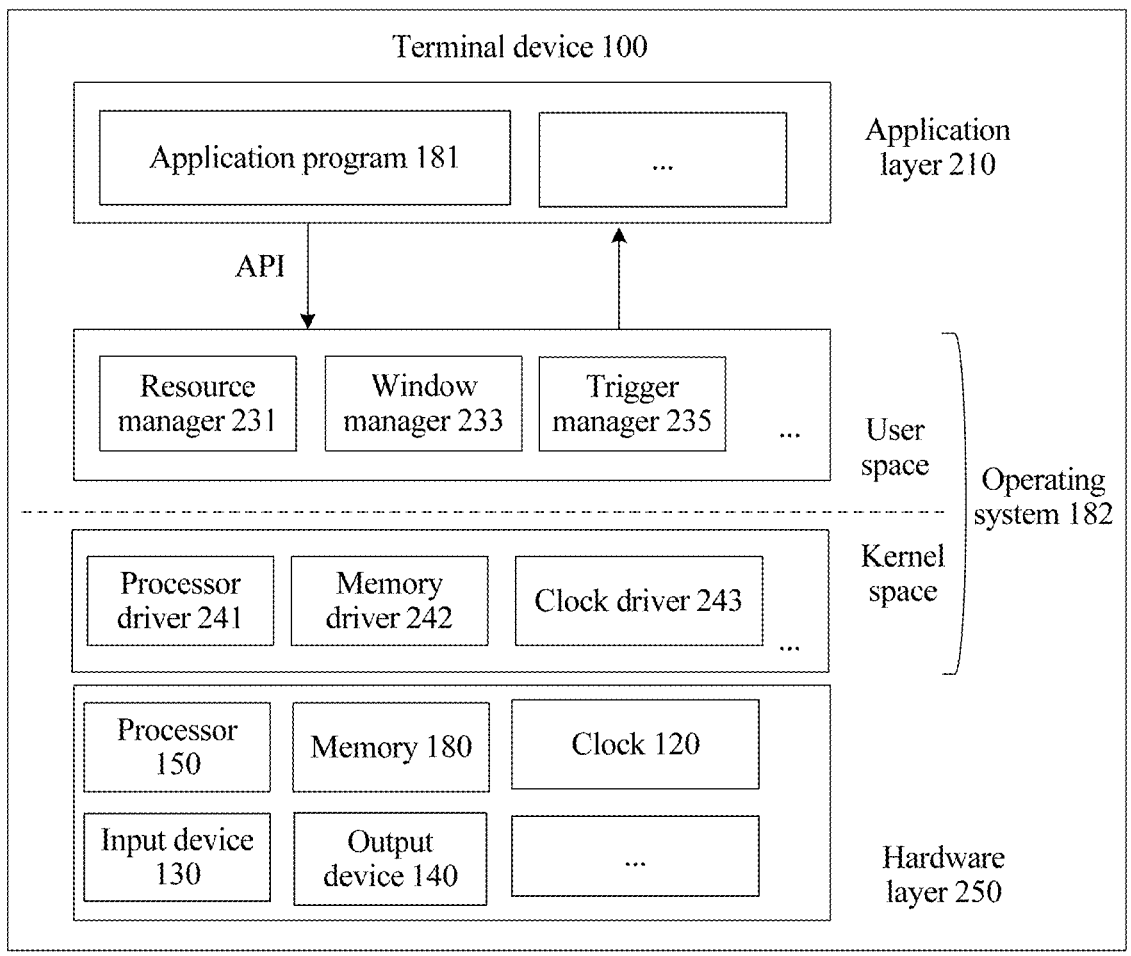
FIG. 2 is a schematic diagram of a logical architecture of a terminal device according to an embodiment of this application.

In an embodiment, components included in the terminal device 100 may be logically divided into a hardware layer 250, an operating system 182, and an application layer 210 that are shown in FIG. 2. The hardware layer 250 includes hardware resources such as the processor 150, the memory 180, the clock 120, the input device 130, and the output device 140 that are shown in FIG. 1. The application layer 210 includes one or more application programs, for example, the application program 181 shown in FIG. 1. The application program 181 may be any type of application program such as a social application, a media player, or a browser. As an abstract layer between the hardware layer 250 and the application layer 210, the operating system 182 is configured to provide core system services, for example, security, memory management, process management, a network stack, and a driver. Usually, the operating system 182 may be divided into two parts: kernel space and user space. Hardware-related drivers, for example, a processor driver 241, a memory driver 242, and a clock driver 243, are located in the kernel space. Basic services required by the application program at the application layer 210, for example, a resource manager 231, a window manager 233, and a trigger manager 235, are in a user space, and are provided to the application program through an application programming interface (API). A person skilled in the art may understand that, the terminal device 100 may include more or fewer components than those shown in FIG. 1 and FIG. 2, and the terminal device shown in each of FIG. 1 and FIG. 2 includes only components more related to a plurality of implementations disclosed in the embodiments of this application.

The trigger manager 235 in FIG. 2 is configured to manage all triggers on the terminal device 100, and a function of the trigger manager 235 may be implemented by the processor 150 by reading and executing the computer program or the instruction in the memory 180. The computer program or the instruction may be included in the operating system 182. As described above, the trigger is set by an application program to trigger a scheduled task when a specified triggering condition is met. The scheduled task herein includes, but is not limited to, starting an activity, sending a broadcast, starting a service, or initiating network communication. The trigger includes, but is not limited to, an alarm or a timer that is configured to trigger a scheduled task at a specified time or periodically, a job information (JobInfo) object that triggers, based on a specified condition, a task to be executed, or the like.

Figure 3:
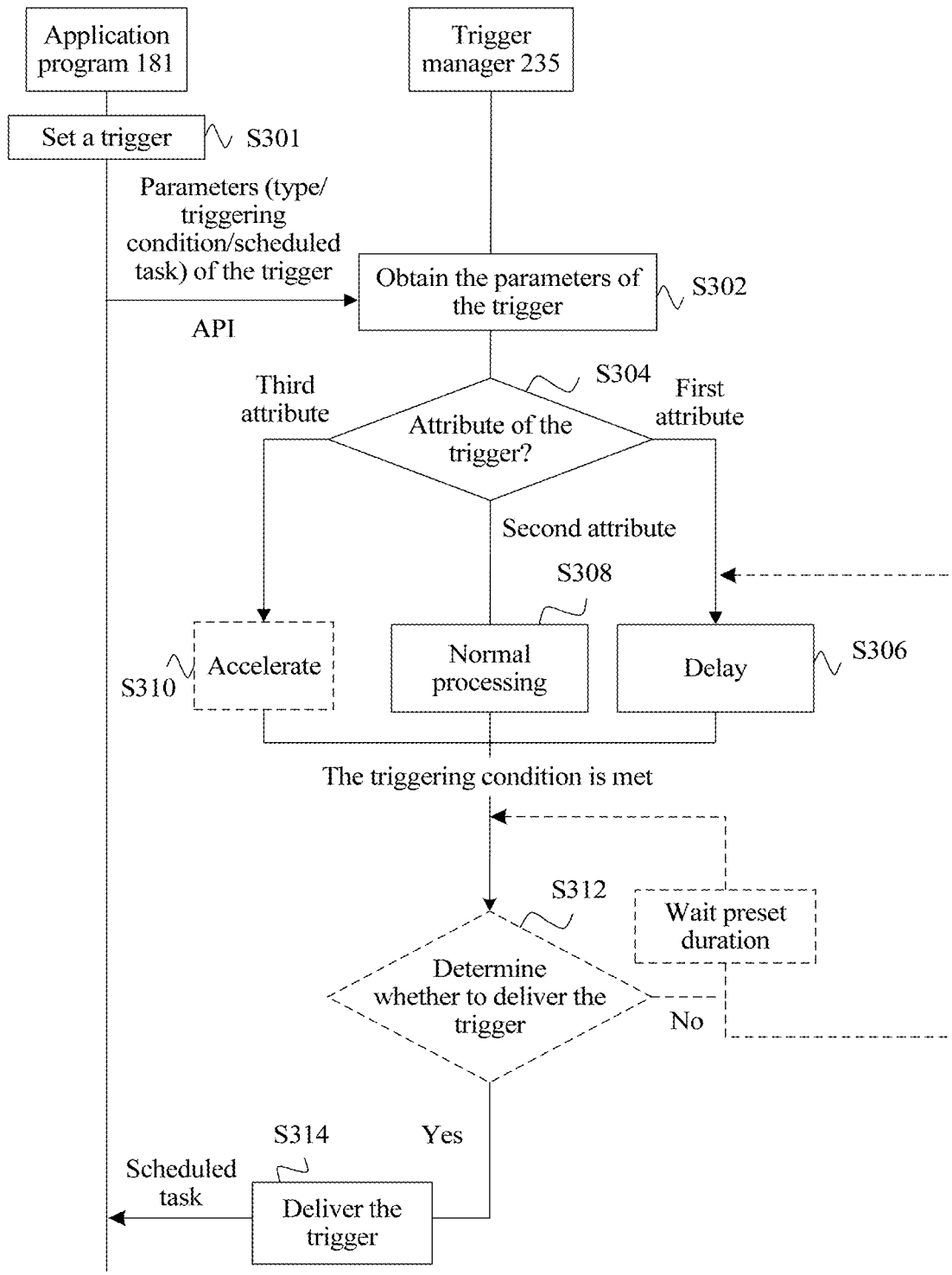
FIG. 3 is a flowchart of a method for managing a trigger according to an embodiment of this application.

The trigger manager 235 provides the API to the application program at the application layer 210. The application program sets a trigger by invoking the API. A parameter of the trigger that is set is transferred to the trigger manager 235 through the API. The trigger manager 235 determines, based on the parameter of the trigger, the trigger that is set by the application program, and manages the trigger. Referring to FIG. 3, a method for managing a trigger by the trigger manager 235 in this embodiment of this application includes the following operations.

S301. The application program 181 sets one or more triggers.

Information such as a type, a triggering condition, and a to-be-triggered task of the trigger is transferred to the trigger manager 235 as parameters. In an embodiment, the triggering condition of the trigger may be related to time. For example, the application program 181 may set an alarm that is configured to trigger a scheduled task at a specified triggering time, or set a repeating alarm that repeatedly triggers a scheduled task at a specified time interval (triggering period). In this case, the application program 181 transfers parameters such as a type, a triggering time, and a scheduled task of the alarm to the trigger manager 235. For the repeating alarm, information that needs to be transferred further includes the time interval. In another embodiment, the triggering condition of the trigger may be related to a status of the terminal device, for example, a network connection type, a battery level, remaining storage space, and whether the terminal device is in a charging state. The application program 181 may set a trigger that triggers, when the status of the terminal device meets a specified condition, a scheduled task to be executed, for example, a JobInfo object in an Android operating system. In another embodiment, the triggering condition of the trigger may be related to both time and a status of the terminal device. For example, the application program 181 may set a trigger that triggers, at an interval of two hours when the device is idle or being charged, a corresponding task to be executed.

S302. The trigger manager 235 obtains the parameters of the trigger that are transferred by the application program 181, and determines, based on these parameters, the trigger that is set by the application program 181, in other words, determines key information such as the type, the triggering condition, and the to-be-triggered scheduled task of the trigger.

The key information may also be referred to as characteristic information of the trigger. The key information of the trigger is usually recorded by using a particular data structure, for example, a class, a container, a structure body, or an array. The data structure is essentially a logical entity of the trigger. Therefore, a process of determining the trigger by the trigger manager 235 is essentially building the logical entity of the trigger based on the parameters of the trigger. The trigger manager 235 subsequently processes the trigger based on the logical entity. An alarm is used as an example, and key information of the alarm may be recorded by using an Alarm class:

private static class Alarm{
    public int type;
    public long when;
    public long repeatInterval;
    public PendingIntent operation;
    public int pid};

where a type field records a type of the alarm. A when field records a triggering time of the alarm. A repeatInterval field records a time interval for executing the alarm. If the alarm needs to be executed only once, the field is 0. If the alarm needs to be repeatedly executed, the field is a time interval in a unit of millisecond. An operation field records a task triggered when the alarm is executed. A pid field records an identifier (process identifier) of a process that sets the alarm. The trigger manager 235 builds the Alarm class based on parameters of the trigger to record the key information of the alarm. The Alarm class is also referred to as a logical alarm. The trigger manager 235 performs subsequent processing based on the logical alarm.

S304. The trigger manager 235 determines an attribute of the trigger.

The attribute of the trigger is used to distinguish between triggers having different characteristics. The attribute of the trigger is related to one or more of a plurality of factors such as a purpose, a function, a type, a quantity of consumed system resources, and a degree of impact on user experience of the trigger. In an embodiment, a trigger that does not match a will of a user or a use habit of a user, for example, a trigger configured to keep an application alive (periodically start a process or a service), may be defined as a malicious trigger, and an attribute of the trigger is set as a first attribute; a trigger that is set by an application program based on a will of a user or to improve user experience, for example, a reminder alarm that is set by a shopping application based on a snapping-up reminder that is set by a user, or a trigger that is set by a real-time news application to trigger, at a specified time, content to be preloaded from a server so that a user waits less time, is defined as a non-malicious trigger or a good-will trigger, and an attribute of the trigger is set as a second attribute. In another embodiment, a trigger configured to trigger a task that cannot be perceived by a user may be defined as a malicious trigger, and an attribute of the trigger is set as a first attribute; a trigger configured to trigger a task that is set by a user or that can be perceived by a user is defined as a non-malicious trigger, and an attribute of the trigger is set as a second attribute. In another embodiment, a trigger that occupies a relatively large quantity of system resources (CPU, memory, and the like) may be defined as a malicious trigger, and an attribute of the trigger is set as a first attribute; a trigger that occupies a relatively small quantity of system resources may be defined as a non-malicious trigger, and an attribute of the trigger is set as a second attribute.

It should be noted that, the first attribute and the second attribute are used to distinguish between triggers having different characteristics, and triggers having different attributes correspond to different triggering policies. In an embodiment, different attributes may be indicated by using different identifiers or flags. It may be understood that, in addition to the first attribute and the second attribute, more attributes may be defined to distinguish between triggers at a finer granularity. For example, an attribute of a trigger that helps improve user experience is defined as a third attribute. Attributes are not enumerated in this embodiment of the present invention.

S306. When the attribute of the trigger is a first attribute, a triggering policy corresponding to the trigger is delaying triggering, and the trigger manager 235 delays the trigger, so that the trigger is executed later, and the application program 181 is triggered later to execute the scheduled task.

S308. When the attribute of the trigger is a second attribute, a triggering policy corresponding to the trigger is normal triggering, and the trigger manager 235 normally processes the trigger.

S314. When the triggering condition of the trigger is met, the trigger manager 235 delivers the trigger to the application program 181.

Delivering the trigger to the application program is essentially triggering the application program to execute the scheduled task corresponding to the trigger. Specifically, the trigger manager 235 may send the scheduled task corresponding to the trigger to the application program, or invoke, through an interface, the application program to execute the scheduled task. For example, for an alarm, the trigger manager 235 sends a to-be-executed scheduled task to the application program in a broadcast manner, and the application program executes the scheduled task. For a JobInfo object, a job scheduler (Job Scheduler) triggers, by invoking an interface, the application program to execute a scheduled task. For example, the Job Scheduler may invoke a schedule( ) method to trigger a scheduled task to be executed.

In one embodiment, the method for managing a trigger in this embodiment of this application further includes the following operation:

S310. When the attribute of the trigger is a third attribute, a triggering policy corresponding to the trigger is accelerating triggering, and the trigger manager 235 accelerates the trigger, so that the trigger is executed earlier, and the application program 181 is triggered earlier to execute the scheduled task.

It may be understood that, if determining that the trigger is a trigger that has a particular attribute, for example, poses a relatively large threat to the system, the trigger manager 235 may directly stop or prohibit the trigger.

In one embodiment, when the triggering condition of the trigger is met, before delivering the trigger, the trigger manager 235 may further determine, based on a current status of the terminal device, whether to currently deliver the trigger to the application program. Specifically, referring to FIG. 3, before operation S314 of delivering the trigger is performed, the method for managing a trigger in this embodiment of this application further includes the following operation:

S312. Determine, based on a current status of the terminal device, whether the current status of the terminal device meets a preset delivering condition, and if the preset delivering condition is not met, delay delivering the trigger.

Delivering the trigger may be delayed in a plurality of manners. For example, as shown in FIG. 3, the trigger manager 235 may add the trigger to a cache queue, and wait preset duration and then perform a determining procedure in operation S312 again; and if determining that the current status of the terminal device meets the preset delivering condition, perform operation S314 to deliver the trigger to the application program 181. For another example, the trigger manager 235 may delay the trigger again as in operation S306. For another example, the trigger manager 235 may normally process the trigger as in operation S308. The foregoing several manners all can be used to delay delivering the trigger.

The status of the terminal device based on which the determining in operation S312 is performed includes, but is not limited to, information in at least one of the following dimensions: resource usage, a battery level, a work mode, a network connection status, a data transmission status, a name of a foreground application program, a type of the foreground application program, a name of a background application program, or a type of the background application program; and the work mode herein includes a sleep mode and a wakeup mode. In an embodiment, the trigger manager 235 may determine, by using information in a single dimension, whether to deliver the trigger. For example, if the battery level is lower than a specified threshold, or the resource usage is higher than a specified threshold, the trigger manager 235 delays delivering the trigger. In another embodiment, the trigger manager 235 may determine, with reference to the status of the terminal device and a current operation status of a user, for example, a type of a foreground application currently operated by the user (whether the application is a high-resource-consumption application), and a frequency and duration of operating the foreground application by the user, whether to currently deliver the trigger. In another embodiment, the trigger manager 235 may use a classifier to process the foregoing information in a plurality of dimensions that represents the status of the terminal device and/or the current operation status of the user, to determine whether to currently deliver the trigger, and if determining that it is improper to deliver the trigger, delay delivering the trigger. The classifier may be a classifier such as a support vector machine (SVM), logistic regression (LR) algorithm, or a decision tree.

It may be understood that, the operation of determining and the operation of delaying delivering the trigger that are described in S312 may be performed with reference to operations S304, S306, and S310, or may be separately performed. In other words, the trigger manager 235 may not perform operations such as determining the attribute of the trigger and delaying/accelerating processing, but instead, perform only the determining and delivering delaying operations in operation S312 when the triggering condition of the trigger is met.

It can be learned from the foregoing procedure that, the trigger manager 235 first verifies "validity" of triggers to determine attributes of the triggers, and then differently manages (delays, stops, normally processes, or accelerates) the triggers based on the attributes of the triggers to dynamically adjust delivering timings of the triggers. Before delivering the triggers, the trigger manager 235 further changes the delivering timings based on the status of the terminal device.

In operation S304, the trigger manager 235 may determine the attribute of the trigger based on information in one or more dimensions, including but not limited to, the characteristic information of the trigger, characteristic information of the application program that sets the trigger, and characteristic information of historical behavior of the user. The characteristic information of the trigger includes at least one of the type (for example, a one-time trigger or a repeating trigger), the triggering condition, and the to-be-triggered task of the trigger. The characteristic information of the application program includes at least one of a name/an identifier of the application program, a type of the application program, or characteristic information of historical behavior of the application program. The characteristic information of the historical behavior of the user includes at least one of a time and a frequency at which the user uses each application, a location or a motion status when the user uses the application. The characteristic information of the historical behavior of the application program includes at least one of a running log of the application program, an attribute of a trigger that is historically set by the application program, a type of a triggered task, or the like. It should be noted that, the foregoing information in various dimensions may be recorded by using a dedicated data structure, or may be included in an existing record file, for example, a system log or a user log, of the terminal device, and the foregoing information may be determined by analyzing the system log or the user log.

In an embodiment, the trigger manager 235 may determine the attribute of the trigger based on the characteristic information of the historical behavior of the user. The characteristic information of the historical behavior of the user includes an operation record of the user. The operation record of the user includes, but is not limited to, information related to a user operation, such as an application program use record and a personal setting of the user. The application program use record records a name of an application used by the user, for example, a name of an application program recently used by the user. Based on analysis of the operation record of the user, if the application program that sets the trigger is not the application recently used by the user, or the application program is not in a whitelist of trusted application programs that is set by the user, the trigger is a malicious trigger, in other words, the attribute is the first attribute. Otherwise, the attribute of the trigger is the second attribute.

In an embodiment, to determine the attribute of the trigger more accurately, the trigger manager 235 may determine the attribute of the trigger with reference to the foregoing described information in at least two dimensions. For example, based on analysis of the characteristic information of the historical behavior of the user, if the application program that sets the trigger is not the application recently used by the user, and the type of the trigger is the repeating trigger, the trigger is a malicious trigger, in other words, the attribute is the first attribute. Otherwise, the attribute of the trigger is the second attribute.

In another embodiment, the characteristic information of the historical behavior of the user includes an operation record of the user. The operation record of the user may be a user log, and includes, but is not limited to, information related to a user operation, such as an application program use record and a personal setting of the user. The application program use record is used to record an application used by the user, and a situation (for example, a time, a location, and a motion status) when the application is used. Information that reflects a use habit of the user, such as a frequency at which the user uses each application and an application recently used by the user, may be obtained by collecting statistics on and analyzing the application program use record. The trigger manager 235 may determine the attribute of the trigger with reference to information in three aspects: the use habit of the user, a characteristic of the trigger, and a characteristic of the application program. The application program herein is the application program that sets the trigger. It can be learned that, the operation record of the user includes information in one or more dimensions that is related to the use habit or preference of the user, the characteristic information of the application program includes information in one or more dimensions that is related to behavior or an attribute of the application program, and the characteristic information of the trigger includes information in dimensions such as the type, the triggering condition, and the to-be-triggered task of the trigger. The trigger manager 235 may determine, based on information in at least one dimension that represents the use habit of the user, information in at least one dimension that represents the characteristic of the application program, and information in at least one dimension that represents the characteristic of the trigger, whether the task triggered by the trigger that is set by the application program matches a true will of the user or the use habit of the user, to determine the attribute of the trigger.

The foregoing embodiment is merely an example, and the trigger manager 235 may determine the attribute of the trigger by using information in one or more dimensions that represents the use habit of the user, information in one or more dimensions that represents the characteristic of the application program, and characteristic information in one or more dimensions of the trigger, or any combination thereof. It may be understood that, the trigger manager 235 determines the attribute of the trigger more accurately by using information in more dimensions. When determining the attribute of the trigger by using information in a plurality of dimensions, the trigger manager 235 may input the information in the plurality of dimensions to a classifier for processing, to determine the attribute of the trigger. The classifier may be obtained through training by machine learning. For example, a classifier such as a support vector machine (SVM), logistic regression (LR) algorithm, or a decision tree may be used. A process of determining the attribute of the trigger by the trigger manager 235 is described below by using a specific example.

For example, assuming that the application program 181 sets a trigger X through an API of the trigger manager 235, the trigger manager 235 first determines information in the following dimensions:

Type of the application program 181: For example, it is determined whether the application program 181 is an application highly related to time, for example, a stock, instant messaging, or real-time news application. If the application program 181 is not an application highly related to time, the trigger may be not set by the application program 181 because of a real requirement of a user, and the dimension is denoted by 1. Otherwise, the dimension is denoted by 0.

Characteristic of the trigger X: Most common triggers configured to keep an application alive are repeating triggers, and are set to, for example, pull up the application once every five minutes. Therefore, a triggering time parameter of the trigger may be analyzed. If the triggering time parameter of the trigger includes a time interval or a period, the trigger is a repeating trigger, and is probably configured to keep an application alive, and the dimension is denoted by 1. Otherwise, the dimension is denoted by 0.

Characteristic of a task that is triggered by the trigger X: For example, it is determined whether the triggered task cannot be perceived by the user. Generally, after a trigger that is actively set by the user, for example, an alarm, is triggered, the trigger generates behavior that can be perceived by the user, including: switching a visible activity to foreground, changing a background sound playing state, or the like. A task that is triggered by a malicious trigger, for example, starting a service and running the service in background, usually cannot be perceived by the user. If a task that can be perceived by the user is triggered, the dimension is denoted by 0. Otherwise, the dimension is denoted by 1.

Characteristic of historical behavior of the user, for example, an application program recently used by the user: A trigger that is set by an application program that has not been used by the user for a long time is probably a trigger configured to keep an application alive. For an application recently used by the user, the dimension is denoted by 0. Otherwise, the dimension is denoted by 1.

It is difficult to determine, by using information in only one of the foregoing dimensions, whether the trigger is a malicious trigger. Therefore, determining usually needs to be comprehensively performed with reference to information in the foregoing dimensions. In an embodiment, a particular weight may be assigned to information in each dimension, and then a weighted operation is performed on the information in the foregoing dimensions. When a calculation result meets a specified threshold, the trigger is a malicious trigger. In another embodiment, information in each dimension may be abstracted as a vector, and then classified in a binary classifier, to determine the attribute of the trigger (for example, whether the trigger is a malicious trigger). The binary classifier may be a common classifier in the machine learning field, such as an SVM, LR algorithm, or a decision tree. Specific classification and decision processes belong to the prior art, and are not described herein.

It may be understood that, the foregoing describes a specific embodiment in which the attribute of the trigger that is set by the application program is comprehensively determined based on information in a plurality of dimensions: the characteristic information of the historical behavior of the user, the characteristic of the trigger, and the characteristic of the application program. Based on the foregoing embodiment, a person skilled in the art may determine the attribute of the trigger by using information in more dimensions and in more information combination manners.

In another embodiment, the trigger manager 235 may directly determine, based on an application blacklist/whitelist, an attribute of a trigger that is set by an application. For example, assuming that a user configures a whitelist indicating a trusted application, a trigger that is set by the application in the whitelist may be considered as a non-malicious trigger by default. Therefore, the trigger manager 235 may determine an attribute of the trigger by querying the whitelist. Similarly, the user may alternatively set a blacklist to indicate a "dangerous" application program that generates behavior of setting a malicious trigger. If an application program is added to the blacklist, a trigger that is set by the application program is determined as a malicious trigger. Therefore, the trigger manager 235 may alternatively determine an attribute of the trigger by querying the blacklist. The blacklist/whitelist may be configured by the user, or may be obtained from a third-party server. This is not particularly limited in this embodiment of the present invention.

Triggers having different attributes correspond to different triggering policies. For example, the trigger manager 235 may set the following: A triggering policy corresponding to a trigger having the first attribute is delaying triggering. A triggering policy corresponding to a trigger having the second attribute is normal triggering based on a triggering time that is set by an application. A triggering policy corresponding to a trigger having the third attribute is accelerating triggering. In a possible implementation, the terminal device 100 may maintain a triggering policy library. The triggering policy library records a mapping relationship between characteristic information of an application program and a triggering policy. For example, in an example shown in Table 1, the triggering policy library includes a correspondence between a name of an application program and a triggering policy. The trigger manager 235 may determine, by querying the triggering policy library based on a name of an application program, a triggering policy of a trigger that is set by the application program. Alternatively, in a more precise way, the triggering policy library may record a correspondence between characteristic information of an application program, characteristic information of a trigger, and a triggering policy. For example, in an example shown in Table 2, the triggering policy library includes information in a plurality of dimensions such as a name of an application program, a type of a trigger, a time interval (triggering period), and a triggering policy. The trigger manager 235 queries the triggering policy library based on a characteristic of an application program and a characteristic of a trigger, to determine a triggering policy of the trigger. The triggering policy library may be configured by the user, may be downloaded from a server, or may be pushed by a server to the terminal device 100.

TABLE 1

Example 1 of the triggering policy library

| Application program name | Triggering policy |
| --- | --- |
| A | Accelerating triggering |
| B | Delaying triggering |

TABLE 2

Example 2 of the triggering policy library

| Application program name | Trigger type | Interval | Triggering policy |
| --- | --- | --- | --- |
| A | Repeating alarm | <300 s | Delaying triggering |
| B | JobInfo object | >5 min | Normal triggering |

Figure 4:
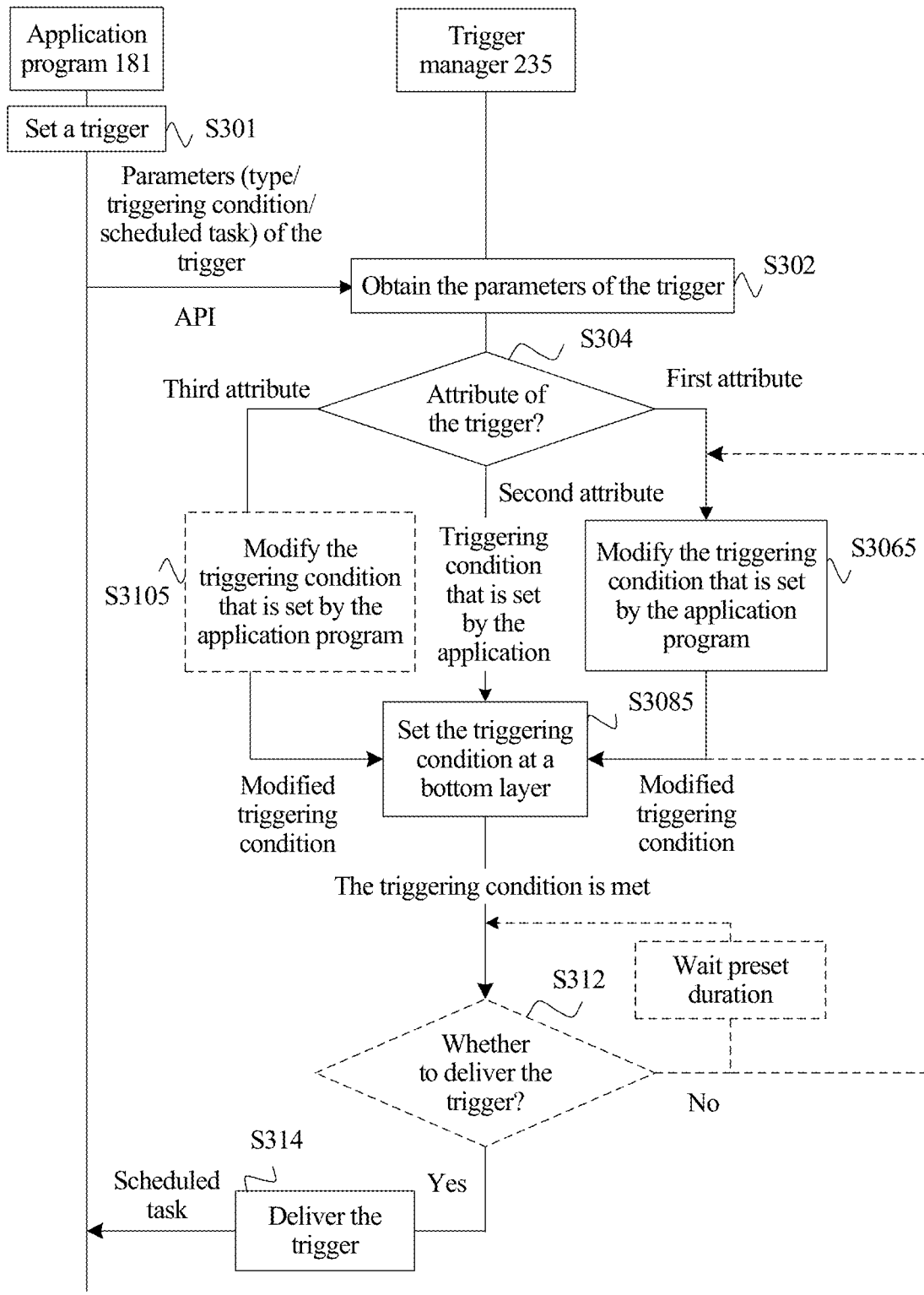
FIG. 4 is a flowchart of a method for managing a trigger according to another embodiment of this application.

After determining the triggering policy of the trigger, the trigger manager 235 may correspondingly process the trigger according to the triggering policy, including but not limited to: delaying processing, normal processing, and accelerating processing. The processing on the trigger mainly includes: setting a triggering condition at a bottom layer and adding the trigger to a trigger queue. The accelerating processing and the delaying processing on the trigger may further include modifying a triggering condition. FIG. 4 shows a specific example of delaying, normally processing, and accelerating the trigger by the trigger manager 235.

Referring to FIG. 4, normal processing performed by the trigger manager 235 on the trigger having the second attribute includes the following operation:

S3085. Configure a triggering condition, for example, a triggering time and/or a time interval (triggering period), at a bottom layer (a driver and/or hardware).

For the trigger having the second attribute, the triggering condition that is set by the trigger manager 235 at the bottom layer is the same as or essentially the same as the triggering condition that is set by the application program 181. When the triggering condition is met, the bottom layer reports a triggering event to the trigger manager 235, and the trigger manager 235 performs a trigger delivering procedure, namely, operations S312 and S314. For related details, refer to the embodiment related to FIG. 3.

Further, as shown in operations S3065, S3105, and S3085 that are shown in FIG. 4, the trigger manager 235 may modify the triggering condition that is set by the application program 181, and then set a modified triggering condition at the bottom layer, so that the triggering condition is met later or earlier, to delay or accelerate the trigger. The triggering condition of the trigger is usually indicated by using one or more parameters related to time and/or a status of the terminal device, for example, a triggering period or a threshold related to the status of the terminal device. Therefore, the trigger may be delayed or accelerated by modifying some or all parameters of the trigger. Because triggering conditions corresponding to different triggers may be different, specific delaying and accelerating procedures are also different. The following several embodiments describe delaying and accelerating processes of several main triggers:

For a trigger whose triggering condition is related to time, for example, an alarm, the trigger manager 235 may change a triggering time and/or a time interval (triggering period) of the trigger, and then configure a changed triggering time and/or time interval (triggering period) in a bottom layer clock. Specifically, if a trigger needs to be delayed, a triggering time that is initially set by the application program 181 may be delayed by preset duration and then configured in the bottom layer clock by using a driver. For a repeating trigger, a triggering period that is initially set may be extended by preset duration and then configured in the bottom layer clock, or both a triggering time and a time interval of the trigger are delayed/extended and then configured in the bottom layer clock. For example, assuming that the initial triggering time is T1, a delayed triggering time is T1+N1. For example, assuming that the initial triggering period that is set by the application program 181 is T2, an extended triggering period is T2+N2. N1 and N2 may be flexibly set based on a specific application scenario, and are not particularly limited herein. Correspondingly, if a trigger needs to be accelerated, a triggering time may be advanced by preset duration and then configured in the bottom layer clock. For a repeating trigger, a time interval (triggering period) of the trigger may be further shortened by preset duration and then configured in the bottom layer clock.

For a trigger whose triggering condition is not related to time but related to a status of the terminal device, the triggering condition of the trigger usually includes one or more parameters related to the status of the device. Therefore, the trigger manager 235 delays or accelerates the trigger by modifying some parameters. For example, if the triggering condition of the trigger is that a battery level of the terminal device is not lower than a specified threshold, the trigger manager 235 may accelerate or delay the trigger by modifying the battery level threshold. If the threshold is increased, the trigger is executed later. If the threshold is decreased, the trigger may be executed earlier.

For a trigger whose triggering condition is related to both time and a status of the terminal device, the trigger manager 235 may modify a parameter related to time, may modify a parameter related to the status of the device, or may modify both.

It should be noted that, when determining in operation S312 not to currently deliver the trigger, the trigger manager 235 may set the triggering condition of the trigger at the bottom layer again, and wait the bottom layer to report a triggering event, to perform a trigger delivering procedure. In one embodiment, the trigger manager 235 may alternatively perform operation S3065, as shown in FIG. 4.

Figure 5:
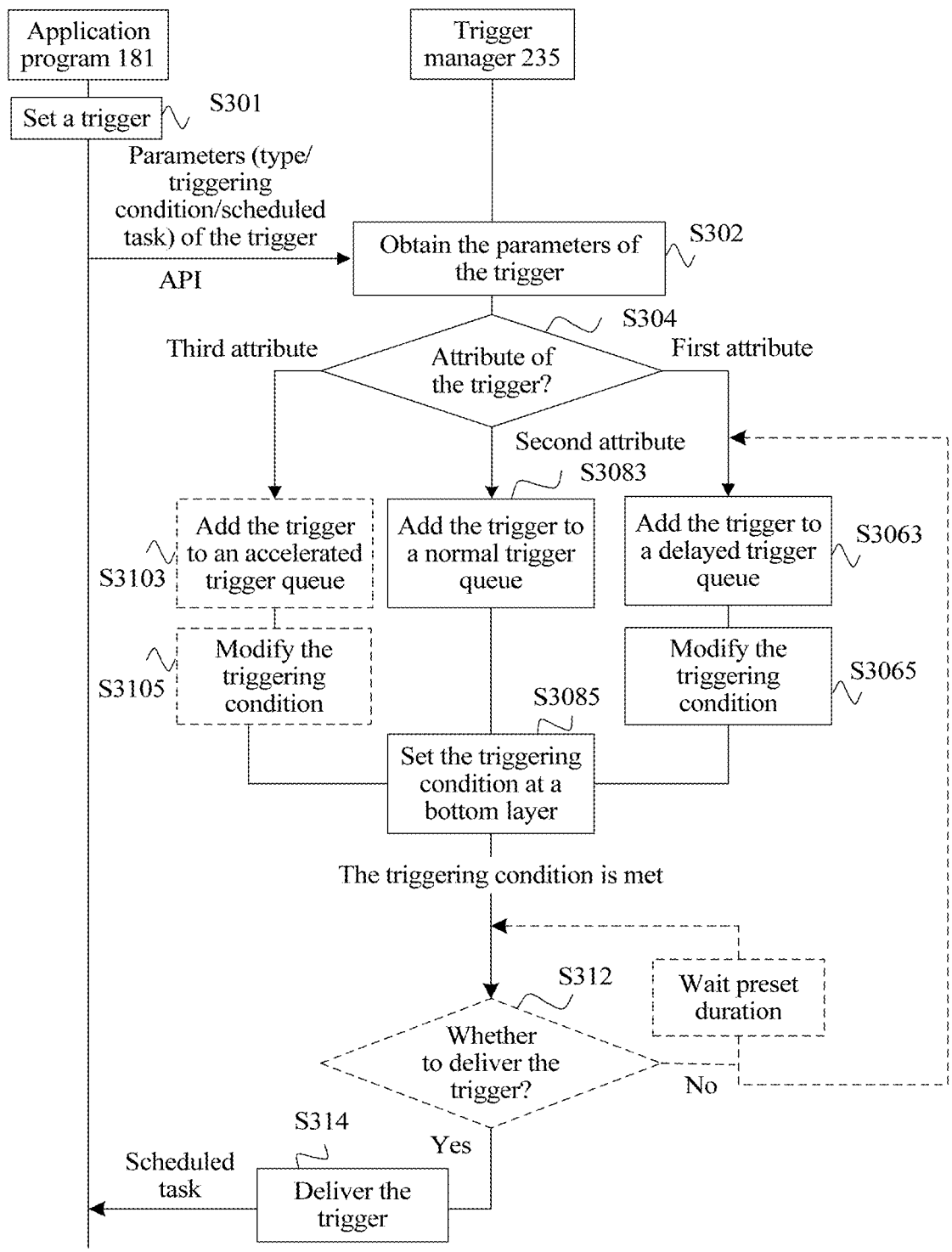
FIG. 5 is a flowchart of a method for managing a trigger according to another embodiment of this application.

Further, based on the embodiment shown in FIG. 4, to better manage triggers having different attributes, a plurality of different types of trigger queues, for example, a normal trigger queue used to cache a trigger having the second attribute, a delayed trigger queue used to cache a trigger having the first attribute, and an accelerated trigger queue used to cache a trigger having the third attribute, may be set. Triggers in different trigger queues have different triggering policies. The trigger manager 235 performs a normal processing procedure for the trigger in the normal trigger queue, performs a delaying procedure for the trigger in the delayed trigger queue, and performs an accelerating procedure for the trigger in the accelerated trigger queue. Specifically, as shown in FIG. 5, the trigger manager 235 adds the trigger having the first attribute to the delayed trigger queue, adds the trigger having the second attribute to the normal trigger queue, and adds the trigger having the third attribute to the accelerated trigger queue. In addition, for triggers in the delayed trigger queue and the accelerated trigger queue, the trigger manager 235 modifies triggering conditions of the triggers and then configures modified triggering conditions at the bottom layer. For specific implementation details, refer to the embodiment related to FIG. 4. Details are not described again.

Figure 6A:
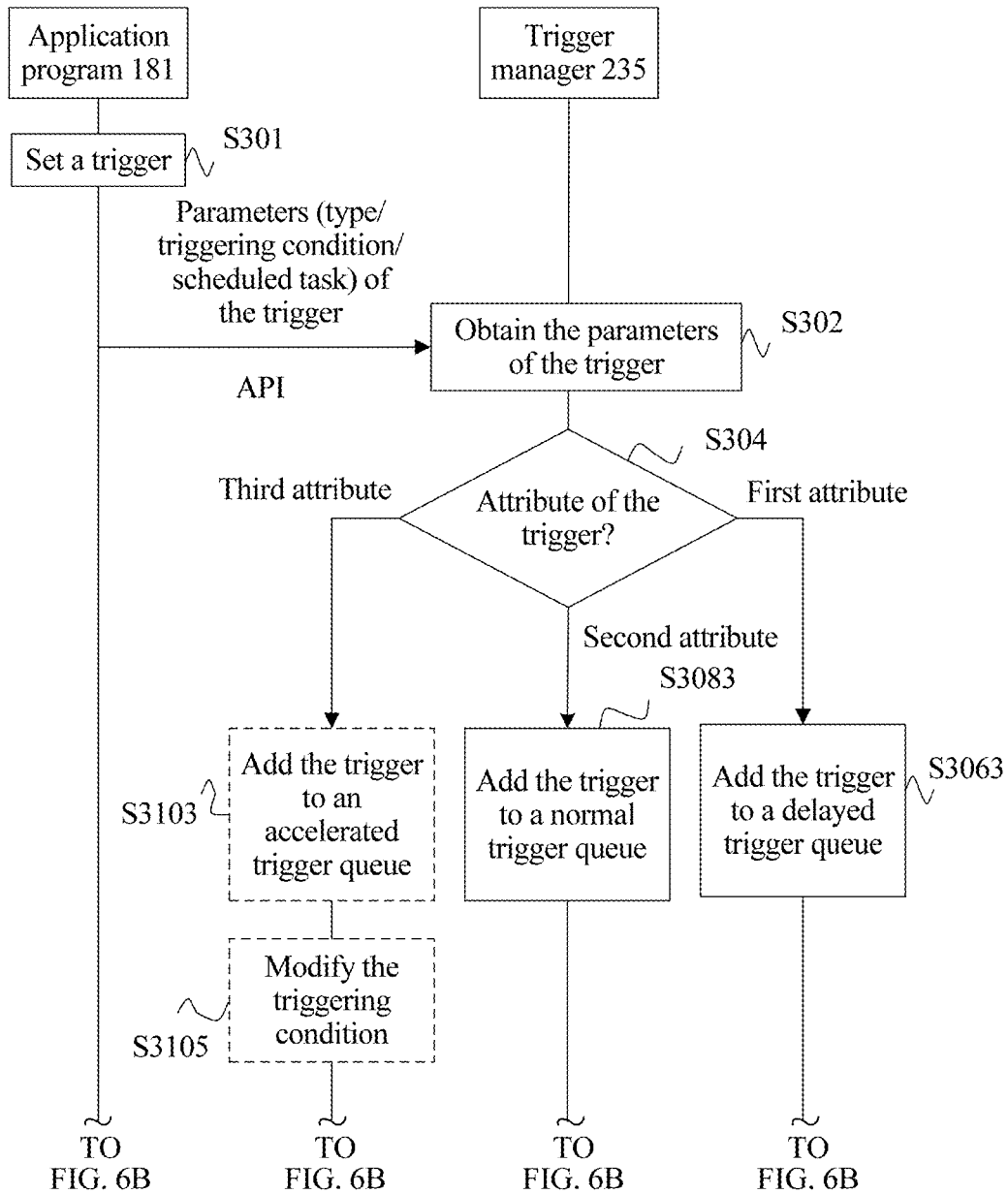
FIG. 6A and FIG. 6B are a flowchart of a method for managing a trigger according to another embodiment of this application.
Figure 6B:
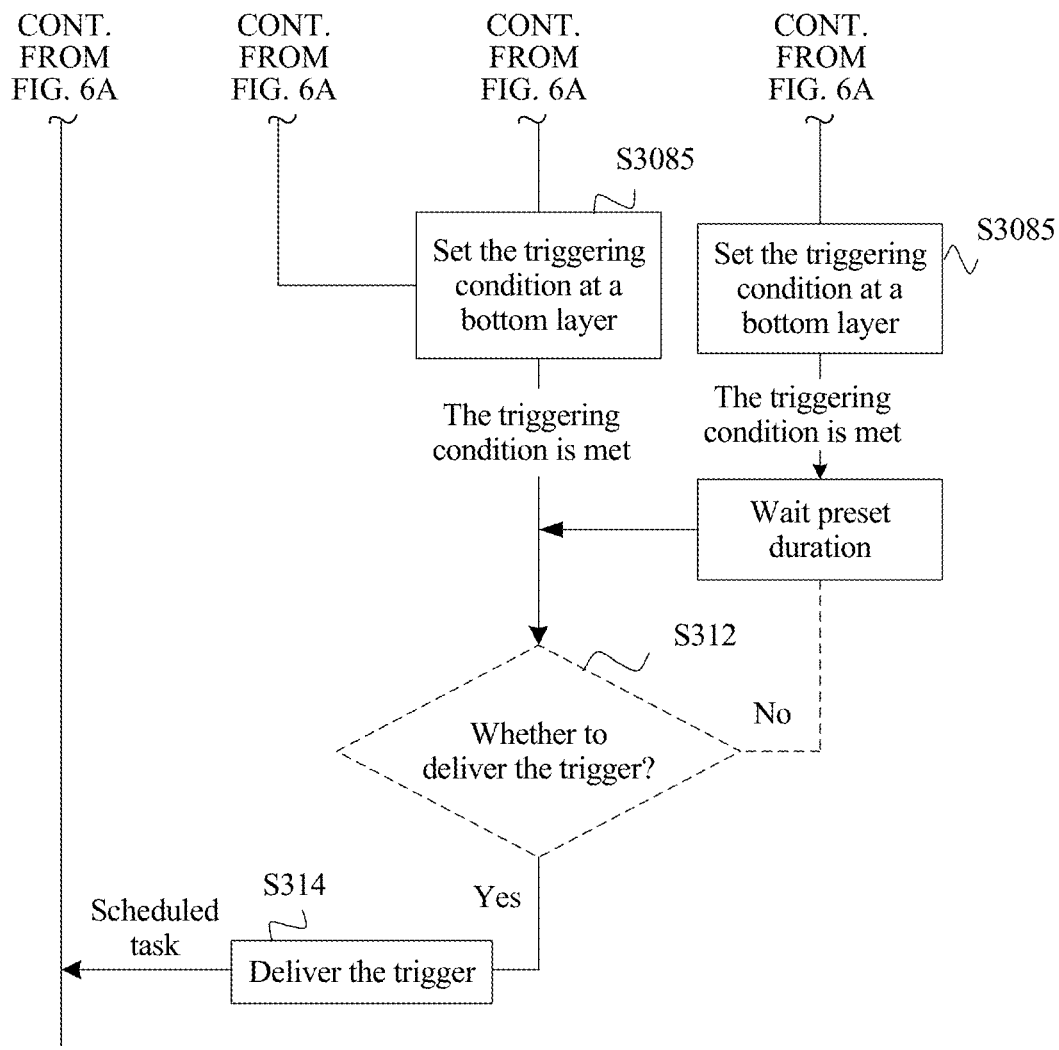

Further, in an embodiment shown in FIG. 5, the trigger having the first attribute may be delayed without modifying the triggering condition of the trigger. Specifically, as shown in FIG. 6A and FIG. 6B, the trigger manager 235 may not modify the triggering condition that is set by the application program 181, but directly set, at the bottom layer, a triggering condition the same as or essentially the same as the triggering condition that is set by the application program 181. When the triggering condition is met, the bottom layer reports a triggering event to the trigger manager 235. The trigger manager 235 does not immediately perform the delivering procedure in operations S312 and S314, but waits preset duration and then performs the trigger delivering procedure, namely, operations S312 and S314. For related details, refer to the embodiment related to FIG. 3. Optionally, after waiting the preset duration, the trigger manager 235 may determine again whether the triggering condition is met, and if the triggering condition is met, performs the trigger delivering procedure. Otherwise, the trigger manager 235 continues to wait the preset duration and then determine again whether the triggering condition is met. The preset duration herein may be flexibly set based on a specific scenario, and is not particularly limited in this embodiment of the present invention.

Figure 7:
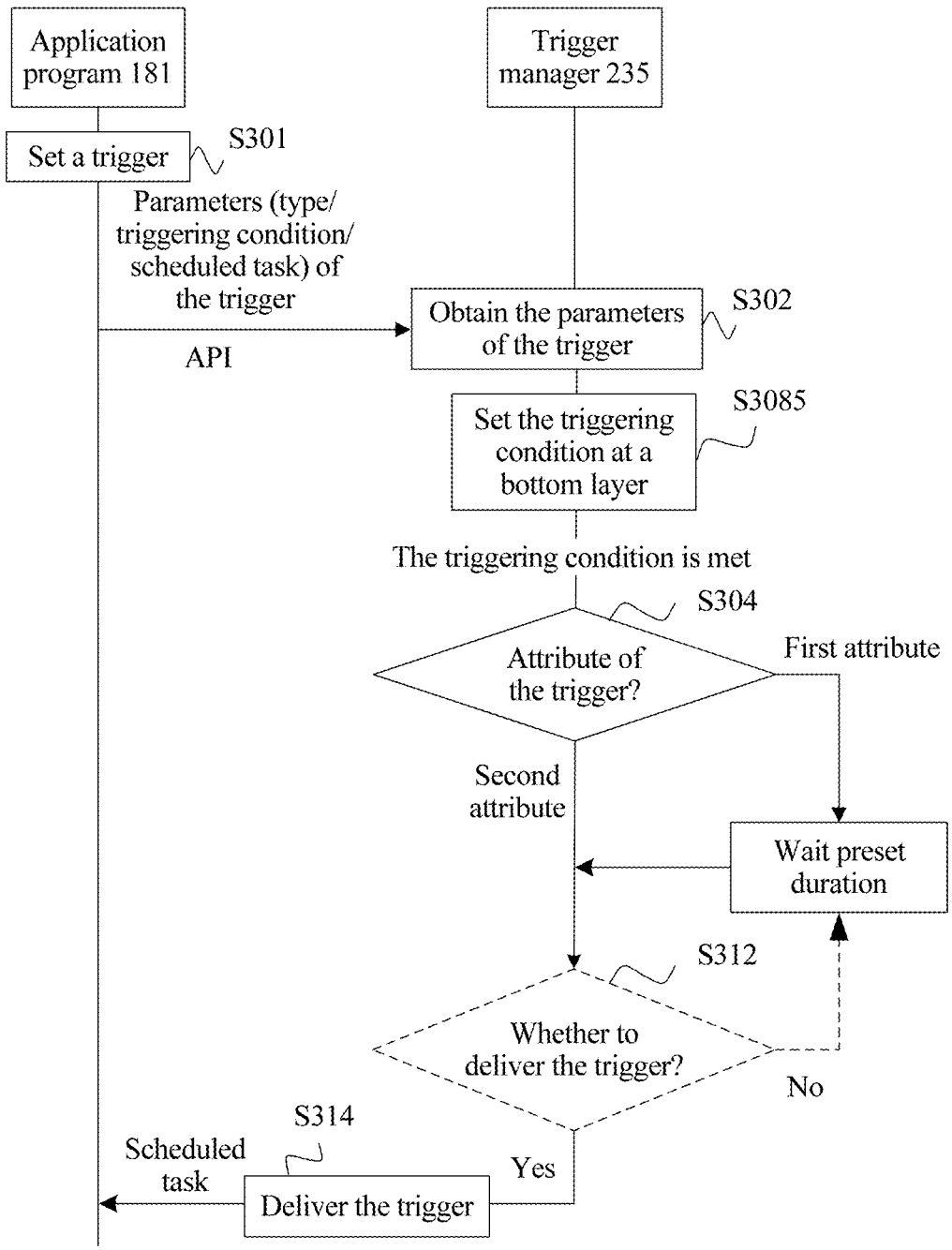
FIG. 7 is a flowchart of a method for managing a trigger according to another embodiment of this application.

In another embodiment, as shown in FIG. 7, the determining, by the trigger manager 235, an attribute of the trigger (operation S304) may be included in a trigger delivering procedure. Specifically, in FIG. 7, after obtaining the parameters of the trigger, the trigger manager 235 sets the triggering condition of the trigger at the bottom layer. When the triggering condition is met, the trigger manager 235 performs operation S304 to determine the attribute of the trigger. When the attribute of the trigger is the first attribute, a triggering policy corresponding to the trigger is delaying triggering, and the trigger manager 235 waits preset duration and then performs the delivering procedure shown in operations S312 and S314, to delay the trigger. When the attribute of the trigger is the second attribute, a triggering policy corresponding to the trigger is normal triggering, and the trigger manager 235 directly performs the delivering procedure shown in operations S312 and S314, to deliver the trigger to the application program 181. Operation S312 is optional. For specific implementation details of operations in FIG. 7, refer to the foregoing embodiment.

A process in which the trigger manager 235 implements different triggering policies for triggers having different attributes is further described below with reference to FIG. 8 to FIG. 10.

Figure 8:
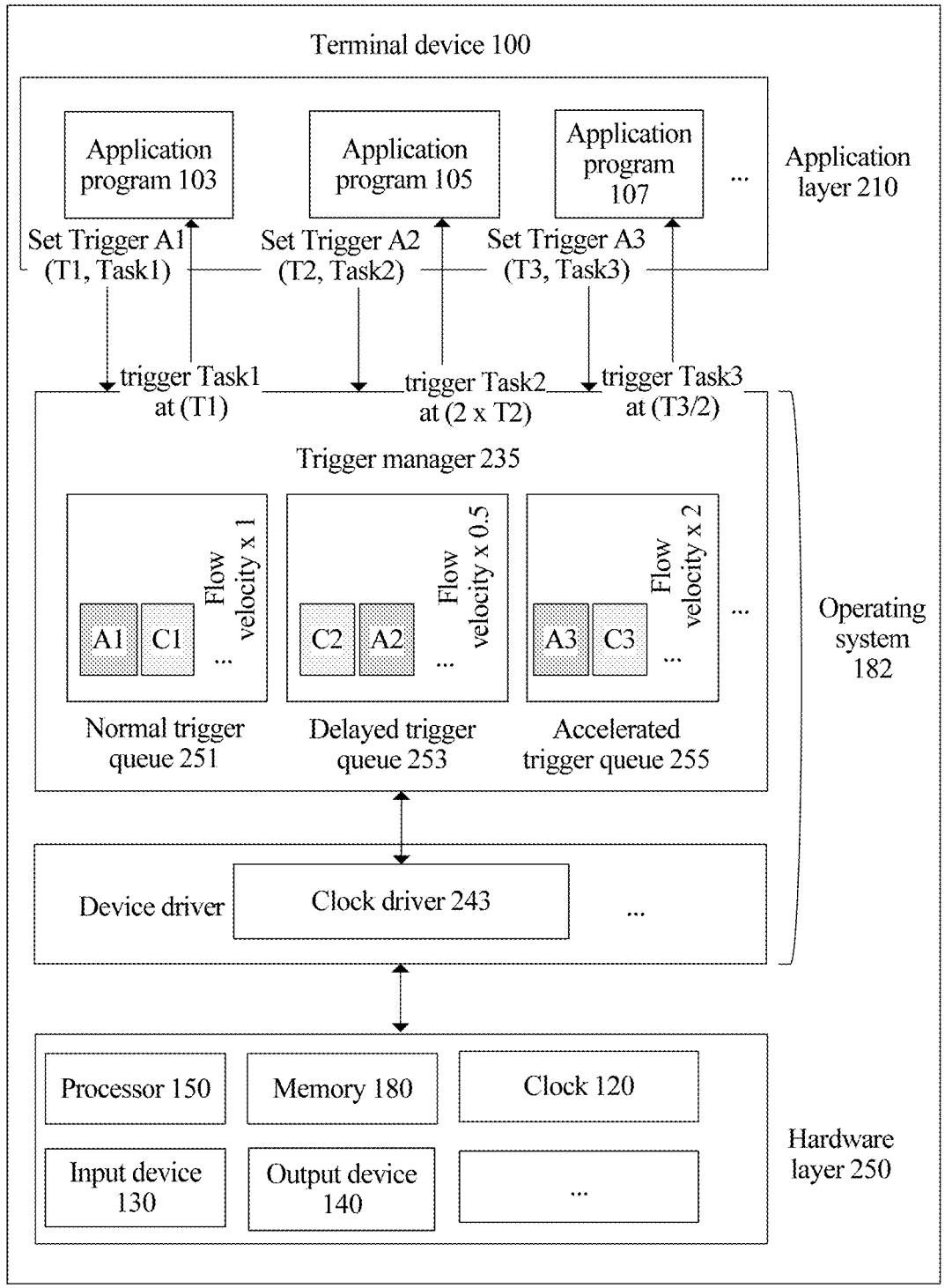
FIG. 8 is a schematic diagram of a process of managing a trigger by a terminal device according to an embodiment of this application.

Application programs 103, 105, and 107 shown in FIG. 8 are examples of applications on the terminal device 100. A person skilled in the art may understand that, the terminal device 100 may include any quantity of application programs. The application programs may set a plurality of triggers, to trigger a plurality of specified tasks to be executed. For example, by using a Set( ) method provided by the trigger manager 235, the application program 103 sets a trigger A1 whose triggering time is T+N1, the application program 105 sets a trigger A2 whose triggering time is T+N2, and the application program 107 sets a trigger A3 whose triggering time is T+N3. The triggers A1, A2, and A3 respectively correspond to-be-triggered tasks Task1, Task2, and Task3.

Figure 9:
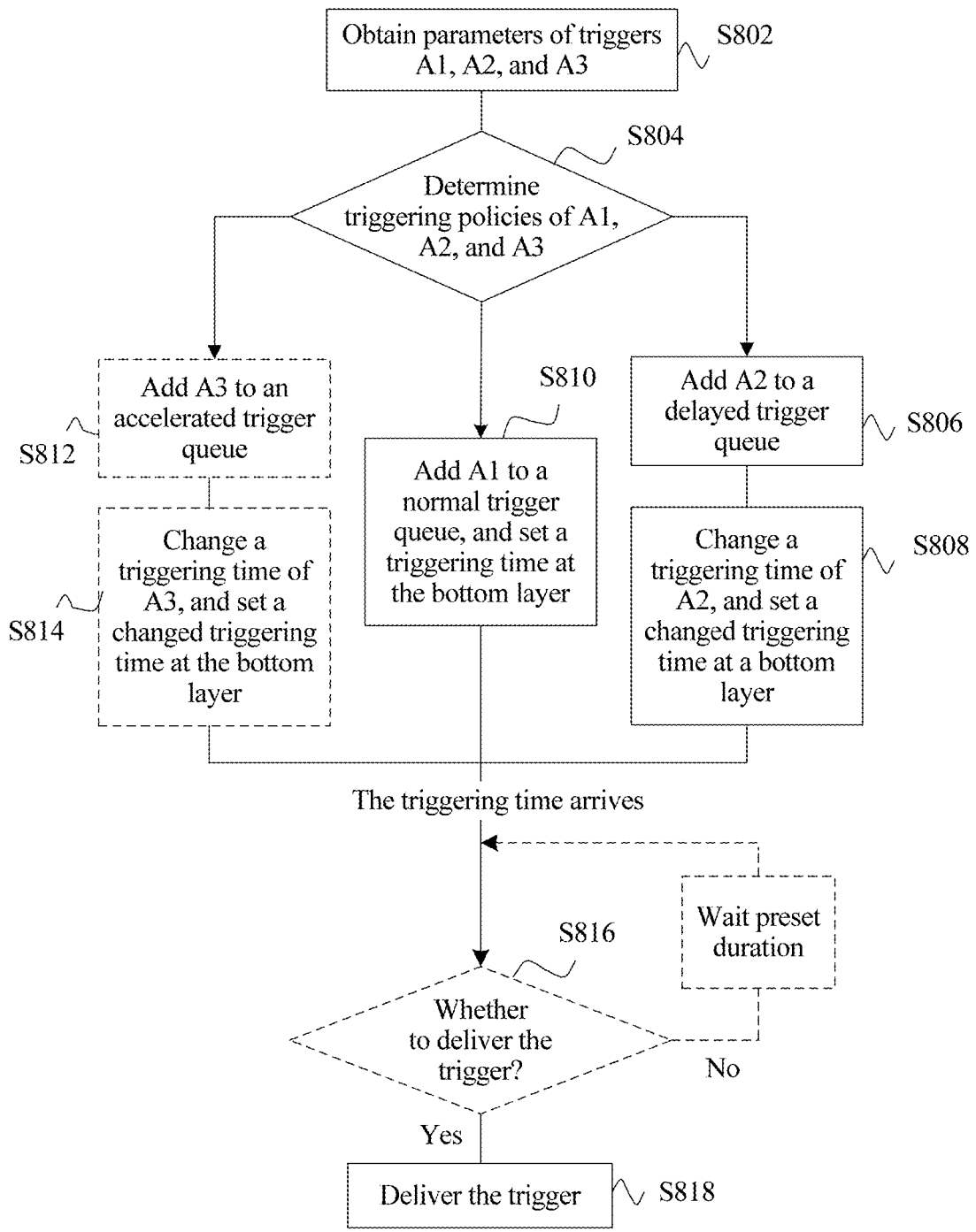
FIG. 9 is a work flowchart of managing a trigger according to an embodiment of this application.

In an embodiment, as shown in FIG. 9, a process of processing the triggers A1, A2, and A3 by the trigger manager 235 is as follows:

In response to the operation of setting the trigger A1 by the application program 103, the trigger manager 235 determines an attribute of the trigger A1. If the attribute of A1 is the second attribute, a triggering policy corresponding to A1 is normal triggering based on the triggering time that is set by the application, and the trigger manager 235 adds the trigger A1 to a normal trigger queue, and sets the triggering time T+N1 of the trigger A1 in the bottom layer clock 120 by using the clock driver 243. When the triggering time of A1 arrives, the clock 120 generates an interrupt, and the clock driver 243 reports a triggering event to the trigger manager 235. In response to the triggering event, the trigger manager 235 delivers the trigger A1 to the application program 103, to trigger the application program 103 to execute the task Task1 corresponding to A1.

In response to the operation of setting the trigger A2 by the application program 105, the trigger manager 235 determines an attribute of the trigger A2. If the attribute of A2 is the first attribute, a triggering policy corresponding to A2 is delaying triggering, and the trigger manager 235 adds the trigger A2 to a delayed trigger queue, and delays the triggering time of A2 by preset duration and then configures a delayed triggering time in the clock 120. When the delayed triggering time arrives, the clock driver 243 reports a triggering event to the trigger manager 235. In response to the triggering event, the trigger manager 235 delivers the trigger A2 to the application program 105, to trigger the application program 105 to execute Task2 corresponding to A2. In this way, an actual triggering time of the trigger A2 is later than the triggering time that is set by the application program, and the task corresponding to A2 is executed later. Therefore, an application program can be prevented from setting a malicious trigger to automatically start at a specified time or periodically, to reduce resource consumption.

Further, if a trigger that is set by an application program triggers a task that helps improve user experience, for example, a trigger is set by an application to stop playing an advertisement after particular duration (for example, 120 s), the trigger manager 235 may accelerate the trigger having the attribute, to improve user experience. Specifically, if the trigger manager 235 determines that an attribute of the trigger A3 that is set by the application program 107 is the third attribute, a triggering policy corresponding to A3 is accelerating triggering, and the trigger manager 235 adds the trigger A3 to an accelerated trigger queue, and advances the triggering time T+N3 of the trigger A3 by preset duration and configures an advanced triggering time in the clock 120. When the advanced triggering time arrives, the clock driver 243 reports a triggering event to the trigger manager 235. In response to the triggering event, the trigger manager 235 delivers the trigger A3 to the application program 107, to trigger the application program 107 to execute Task3 corresponding to A3. In this way, an actual triggering time of the trigger A3 is earlier than the triggering time that is set by the application program, and the task corresponding to A3 is executed earlier, so that user experience can be improved to some extent.

Figure 10:
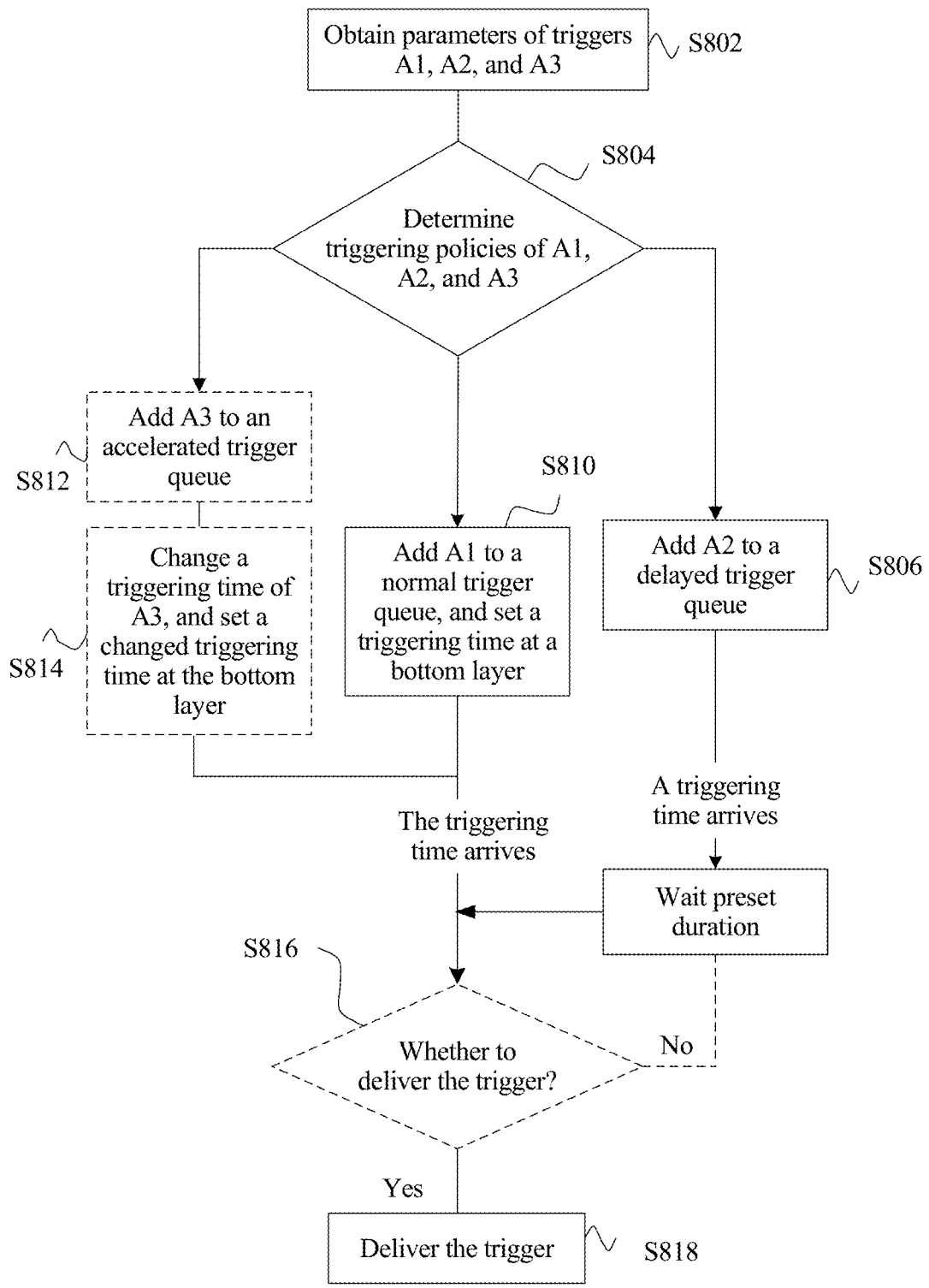
FIG. 10 is a work flowchart of managing a trigger according to another embodiment of this application.

In another embodiment, as shown in FIG. 10, the trigger manager 235 may delay the trigger A2 without modifying the triggering condition of the trigger A2. In FIG. 10, the trigger manager 235 does not modify the triggering condition that is set by the application program 181, but directly sets, in the bottom layer clock, a triggering condition the same as or essentially the same as the triggering condition that is set by the application program 181. When the triggering time of A2 arrives, the bottom layer reports a triggering event to the trigger manager 235. The trigger manager 235 does not immediately deliver A2 to the application program 105, but waits preset duration and then performs a trigger delivering procedure.

A person skilled in the art may understand that, the trigger manager 235 may set any quantity of trigger queues, and the trigger manager 235 adds the triggers A1, A2, and A3 to different trigger queues based on attributes of the triggers. For example, the trigger manager 235 adds the trigger A1 whose attribute is the second attribute to a normal trigger queue 251, adds the trigger A2 whose attribute is the first attribute to a delayed trigger queue 253, and adds the trigger A3 whose attribute is the third attribute to an accelerated trigger queue 255, to perform pertinent processing. For definitions and a determining method for the attributes of the triggers, refer to the foregoing embodiment. Details are not described again.

In an embodiment, similar to the foregoing embodiments shown in FIG. 3 to FIG. 7, before delivering a trigger, the trigger manager 235 may further determine, based on a current status of the terminal device, whether the current status of the terminal device meets a preset delivering condition, and if the preset delivering condition is not met, delay delivering the trigger. For specific implementation details of the determining and the delivering delaying, refer to the description of operation S312 in the embodiment related to FIG. 3. In addition, if the trigger manager 235 sets a plurality of trigger queues having different time flow velocities, in addition to the manner described in operation S312, trigger delivering may be delayed in the following manner: adding the trigger to a queue having a lower time flow velocity. For example, if the trigger is previously in the normal trigger queue 251, the trigger may be migrated to the delayed trigger queue 253. It may be understood that, the trigger may be migrated between different trigger queues by determining whether to deliver the trigger.

The trigger manager provided in the embodiments of the present invention determines attributes of triggers, and uses different processing policies for triggers having different attributes, to delay triggering a malicious trigger that is set to keep an application alive or that does not match a true will of a user. Therefore, an application program is prevented from setting a malicious trigger to trigger a task at a specified time or periodically, to reduce resource consumption. Further, for some triggers that are set to improve user experience, the trigger manager may accelerate triggering of the triggers, to obtain better user experience. Furthermore, before delivering a trigger to an application, the trigger manager determines, based on a current status of the terminal device, whether to currently deliver the trigger, and if the current status of the terminal device does not meet a delivering condition, delays delivering the trigger to the application program, to further reduce the resource consumption.

Figure 11:
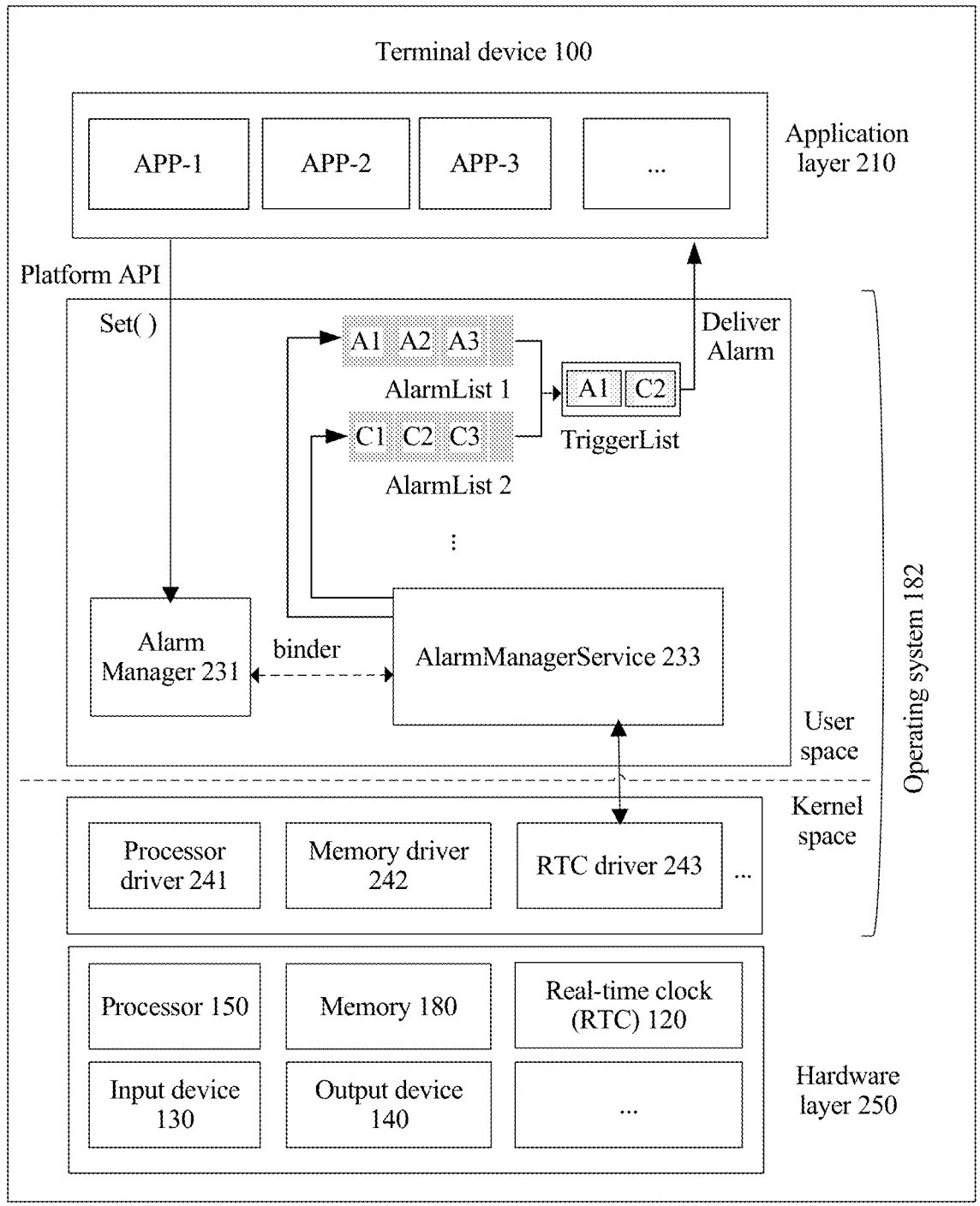
FIG. 11 is a schematic diagram of a process of managing an alarm by a terminal device according to an embodiment of this application.

The trigger manager 235 in the embodiments of the present invention may be implemented by a proper combination of software, hardware, and/or firmware. In a specific example, for the terminal device 100 using the Android operating system, when the foregoing triggers are alarms (alarm), the trigger manager 235 described in the foregoing embodiments may be implemented as a combination of an alarm manager 231 and an alarm management service 233, to implement different management for the alarms (alarm), as shown in FIG. 11. In FIG. 11, an operating system 182 is divided into two parts: kernel space and user space. Hardware-related drivers, for example, a display driver 241, an audio driver 242, and a clock driver 243, are located in the kernel space. Basic services required by an application program at an application layer 210, for example, the alarm manager 231 and the AlarmManagerService 233, are in a user space. The alarm manager 231 supports a one-time timed task and a cyclic timed task, and provides an interface (API) to the application program. For example, the alarm manager 231 may provide the following interfaces to the application program:

void set (int type, long triggerAtMillis, PendingIntent operation); set a one-time alarm; and void setRepeating (int type, long triggerAtMillis, long intervalMillis, PendingIntent operation); set a repeating alarm;

where the foregoing interfaces may also be referred to as member functions of the alarm manager 231, and use parameters including:

type, which indicates a type of the alarm, where the Android system defines four alarm types: RTC WAKEUP, RTC, ELAPSED REALTIME WAKEUP, and ELAPSED REALTIME; for specific definitions, refer to a related description of the Android system, and details are not described herein;

triggerAtMillis, which indicates a timing at which the alarm should be triggered, namely, a triggering time;

operation, which indicates an action that needs to be performed when the alarm is triggered, for example, performing a broadcast notification; and intervalMillis, which indicates a time interval or a triggering period of the repeating alarm.

In addition, a meaning of a triggerAtMillis parameter varies with different type parameters. For example, for the type of RTC or RTC WAKEUP, a value of triggerAtMillis should be a standard time. For another type, a value of triggerAtMillis should be a quantity of milliseconds counted since the terminal device is started this time.

The application program may transfer the parameters of the alarm to the AlarmManagerService 233 by invoking an interface of the alarm manager 231. The AlarmManagerService 233 is a binder entity. A correspondence exists between the AlarmManagerService 233 and the alarm manager 231. An alarm management function of the alarm manager 231 is actually completed by the AlarmManagerService 233.

Figure 12:
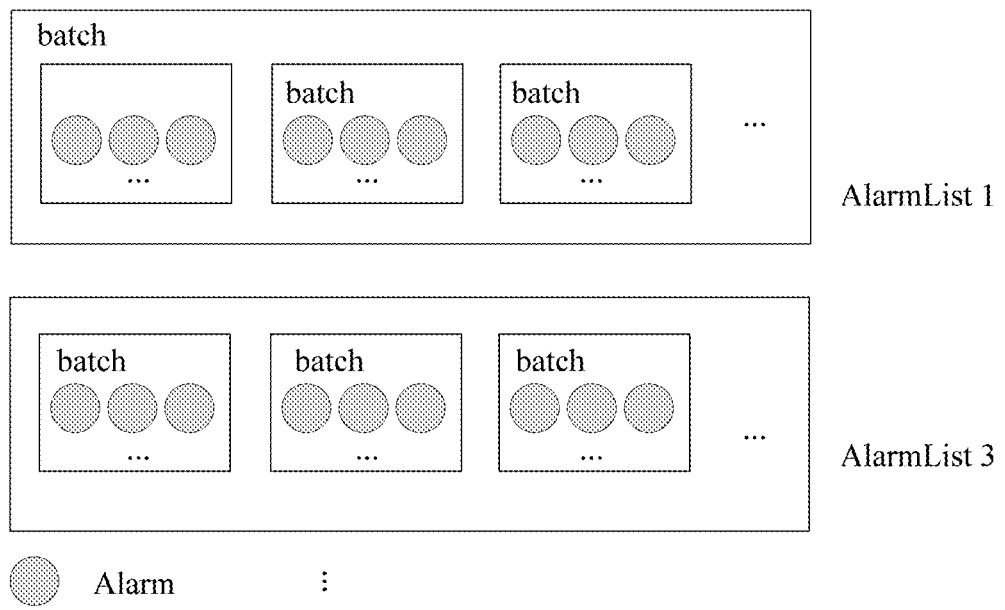
FIG. 12 is a schematic diagram of a multi-trigger queue according to an embodiment of this application.

In one embodiment, the AlarmManagerService 233 builds a corresponding logical alarm to record key information related to the alarm. The logical alarm is in a particular data structure, for example, a class, an array, or a structure body. Further, the AlarmManagerService 233 adds the logical alarm to an alarm list (AlarmList). Similar to that in the embodiment shown in FIG. 8, the AlarmManagerService 233 maintains a plurality of different AlarmLists, for example, a normal AlarmList 1 and a delayed AlarmList 2. Optionally, the AlarmManagerService 233 may further maintain an accelerated AlarmList, to meet a requirement of accelerating triggering of some alarms. Correspondingly, for each alarm, the AlarmManagerService 233 first determines an attribute of the alarm, and adds the alarm to a corresponding AlarmList according to a triggering policy corresponding to the attribute of the alarm. As shown in FIG. 12, the AlarmManagerService 233 adds alarms having close triggering times to a same batch in an AlarmList, and all batches are sorted in the AlarmList by time. If a triggering time of an alarm is not close to that of any other alarm, the AlarmManagerService 233 newly creates a dedicated batch for the alarm.

Further, the AlarmManagerService 233 sets the triggering time of the alarm in a bottom layer RTC 120, for example, may set the triggering time of the alarm in the RTC by using a rescheduleKernelAlarmsLocked function. Specifically, for an alarm whose attribute is the first attribute, for example, an alarm configured to keep an application alive, a triggering policy corresponding to the alarm is delaying triggering, and the AlarmManagerService 233 delays a triggering time of the alarm by a particular time duration and then sets a delayed triggering time in the bottom layer RTC. For an alarm whose attribute is the second attribute, for example, an alarm that is set by an application program based on a will of a user, a triggering policy corresponding to the alarm is normal triggering, and the AlarmManagerService 233 sets a triggering time of the alarm in the bottom layer RTC. For an alarm whose attribute is the third attribute, a triggering policy corresponding to the alarm is accelerating triggering, and the AlarmManagerService 233 advances a triggering time of the alarm by preset duration and then sets an advanced triggering time in the bottom layer RTC.

The AlarmManagerService 233 starts a thread to cyclically listen to alarm triggering events reported by the bottom layer RTC. When the RTC reports an alarm triggering event, it means that a triggering time of an alarm that is set by the AlarmManagerService 233 in the RTC arrives. In response to the alarm triggering event, the AlarmManagerService 233 obtains the alarm from an AlarmList, and adds the alarm to a trigger list (TriggerList). If a current status of the terminal device 100 meets a preset delivering condition, the AlarmManagerService 233 delivers the alarm in the TriggerList to an application program. Otherwise, the AlarmManagerService 233 delays delivering the alarm in the TriggerList. An alarm delivering process is a process of executing an alarm.operation.send( ) function of the AlarmManagerService 233 to send a task corresponding to the alarm to the application program, so that the application program executes the task. The operation herein is a PendingIntent object that is transferred to the AlarmManagerService 233 when the alarm is set. In addition, for a repeating alarm, after receiving an alarm triggering event corresponding to the alarm, in addition to performing the foregoing procedure, the AlarmManagerService 233 further calculates a next triggering time of the alarm based on a triggering period of the alarm, and then sets the next triggering time in the bottom layer RTC.

In the technical solutions provided in this embodiment of the present invention, attributes of alarms that are set by application programs are dynamically determined based on use habits of users, characteristics of the alarms, and characteristics of the applications, and different triggering policies are executed for triggers having different attributes. This reduces events that are not beneficial or are harmful to the system and the users, reduces impact on foreground available resources, and reduces power consumption.

In another example, for the terminal device 100 using the Android operating system, when the foregoing trigger is a JobInfo object, the trigger manager 235 described in the foregoing embodiments may be implemented as a job scheduler (JobScheduler) and another operating system component associated with the Job Scheduler, for example, a Job Service. The JobScheduler is an API configured to schedule various types of tasks. An application program may build a JobInfo object by using a JobInfo.Builder class. The JobInfo object includes a parameter required to schedule a scheduled task. The application program further transfers the JobInfo object built by the application program to the JobScheduler by using a schedule( ) method of the JobScheduler. When a triggering condition of the JobInfo object is met, the Job Scheduler triggers the application program to execute the task corresponding to the JobInfo object. Specifically, the Job Scheduler determines a triggering policy of the JobInfo object based on at least one of characteristic information of the JobInfo object, characteristic information of the application program that builds the JobInfo object, or a characteristic of historical behavior of a user, and then performs delaying processing, normal processing, or accelerating processing. For specific details of various types of processing on the trigger, refer to the foregoing embodiments. Details are not described again.

Figure 13:
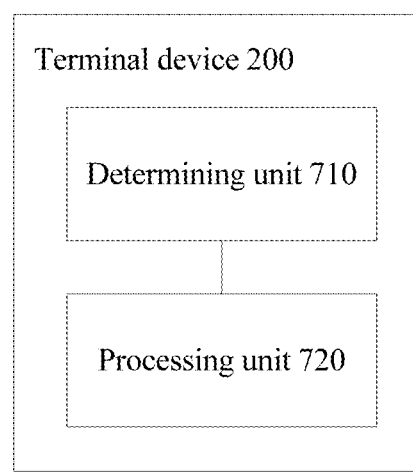
FIG. 13 is a schematic structural diagram of a terminal device according to an embodiment of this application.

Based on the method for managing a trigger described in the foregoing embodiments, an embodiment of the present invention further provides a terminal device 200. As shown in FIG. 13, the terminal device 200 includes: a determining unit 710 and a processing unit 720. The determining unit 710 is configured to obtain a trigger that is set by an application program, and determine an attribute of the trigger. The processing unit 720 is configured to delay, normally process, or accelerate the trigger based on the attribute of the trigger. The determining unit 710 and the processing unit 720 may be implemented by a proper combination of software, hardware, and/or firmware, for example, implemented as one or more functional modules that are included in an operating system and that are implemented by code. In another embodiment, the determining unit 710 and the processing unit 720 may be a processor. For specific implementation details of determining the attribute of the trigger by the determining unit 710 and specific implementation details of delaying, normally processing, or accelerating the trigger by the processing unit 720, refer to related descriptions in the foregoing embodiments.

Figure 14:
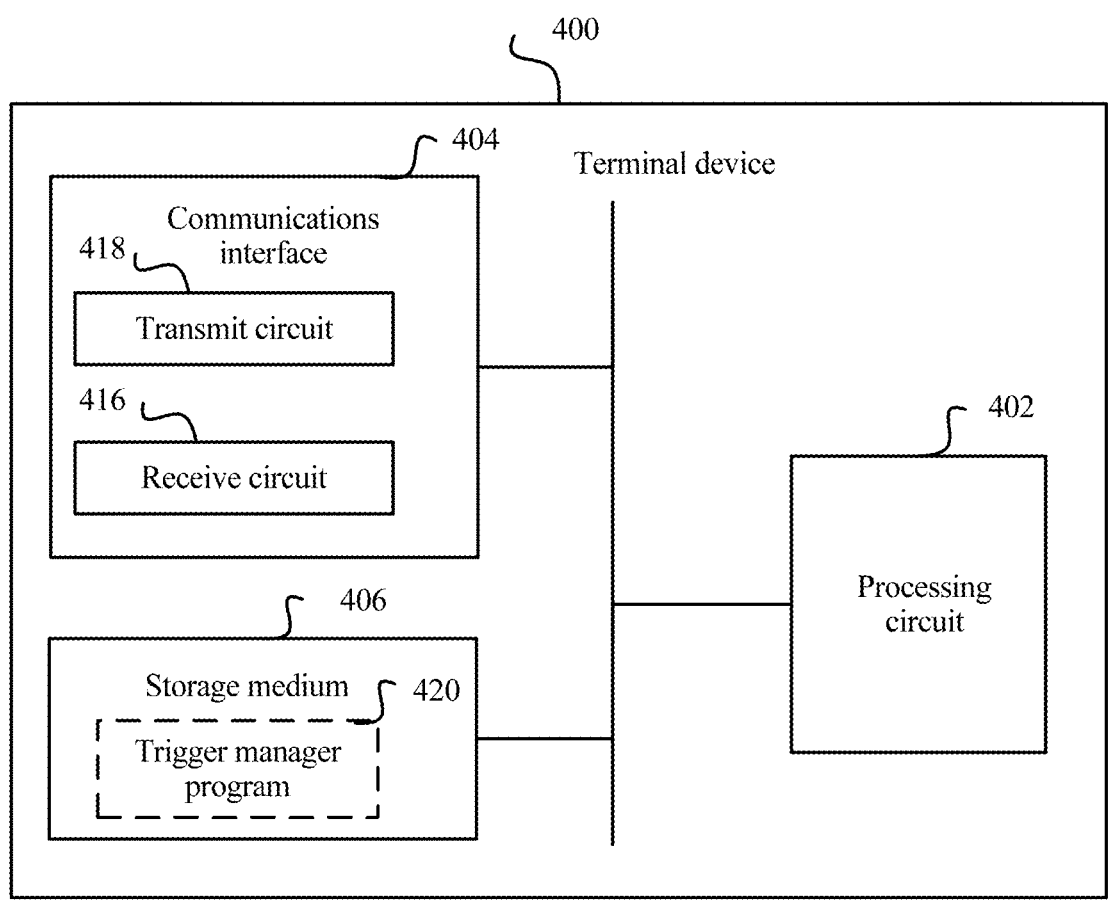
FIG. 14 is a schematic structural diagram of a terminal device according to another embodiment of this application.

An embodiment of the present invention further provides a terminal device 400. As shown in FIG. 14, the terminal device 400 includes: a processing circuit 402, and a communications interface 404 and a storage medium 406 that are connected to the processing circuit 402.

The processing circuit 402 is configured to process data, control data access and storage, issue a command, and control another component to perform an operation. The processing circuit 402 may be implemented as one or more processors, one or more controllers, and/or another structure that can be used to execute a program. The processing circuit 402 may include at least one of a general purpose processor, a digital signal processor (DSP), an application-specific integrated circuit (ASIC), a field programmable gate array (FPGA), or another programmable logic component. The general purpose processor may include a microprocessor, any conventional processor, a controller, a microcontroller, or a state machine. Alternatively, the processing circuit 402 may be implemented as a computing component, for example, a combination of a DSP and a microprocessor.

The storage medium 406 may include a non-transitory computer-readable storage medium, for example, a magnetic storage device (for example, a hard disk, a floppy disk, or a magnetic strip), an optic storage medium (for example, a digital versatile disc (DVD)), a smart card, a flash memory device, a random access memory (RAM), a read-only memory (ROM), a programmable ROM (PROM), an erasable PROM (EPROM), a register, and any combination thereof. The storage medium 406 may be coupled to the processing circuit 402, so that the processing circuit 402 can read information from and write information to the storage medium 406. Specifically, the storage medium 406 may be integrated into the processing circuit 402, or the storage medium 406 and the processing circuit 402 may be separated.

The communications interface 404 may include a circuit and/or a program to implement bidirectional communication between the terminal device 400 and one or more network devices (for example, a router, a switch, or an access point). The communications interface 404 includes at least one receive circuit 416 and/or at least one transmit circuit 418. In an embodiment, the communications interface 404 may be completely or partially implemented by a wireless modem.

In an embodiment, the storage medium 406 stores a trigger manager program 420, and the processing circuit 402 is adapted to execute the trigger manager program 420 stored in the storage medium 406, to implement all or some operations in any one of the embodiments shown in FIG. 3 to FIG. 11.

It may be clearly understood by a person skilled in the art that, for convenience and brevity of description, for detailed working processes of the foregoing described apparatuses and units, refer to corresponding processes in the foregoing method embodiments, and details are not described herein again.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some characteristics may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The storage medium includes various media that can store program code, such as a USB flash drive, a removable hard disk, a read-only memory (ROM), a random access memory (RAM), a magnetic disk, or an optical disc.

What is claimed is:

1. A method for managing a trigger on a terminal device, comprising:
   determining a first trigger that is set by a first application program on the terminal device, wherein the first trigger is set to trigger a first task at a first moment;
   determining a triggering policy of the first trigger based on an attribute of the first trigger, wherein the triggering policy is normal triggering, delaying triggering, or accelerating triggering; and
   when the triggering policy of the first trigger is normal triggering, executing the first trigger at the first moment to trigger the first task; or
   when the triggering policy of the first trigger is delaying triggering, delaying the first trigger, so that the first task is triggered at a moment later than the first moment;

when the triggering policy of the first trigger is accelerating triggering, the method further comprises accelerating the first trigger, so that the first task is triggered at a moment earlier than the first moment, wherein
the attribute of the first trigger is determined based on at least one of characteristic information of historical behavior of a user, characteristic information of the first application program, or characteristic information of the first trigger.

2. The method according to claim 1, further comprising: delaying, based on at least one of a status of the terminal device or a current operation status of the user, delivering the first trigger to the first application program.

3. The method according to claim 2, wherein the status of the terminal device comprises at least one of resource usage, a battery level, a work mode, a network connection status, a data transmission status, a name of a foreground application program, a type of the foreground application program, a name of a background application program, or a type of the background application program of the terminal device; and the work mode of the terminal device is a sleep mode or a wakeup mode.

4. The method according to claim 1, wherein the delaying the first trigger comprises: changing a triggering time of the first trigger from the first moment to a second moment, wherein the second moment is later than the first moment.

5. The method according to claim 1, wherein the terminal device maintains a normal trigger queue and a delayed trigger queue; and when the attribute of the first trigger is a first attribute, the triggering policy of the first trigger is delaying triggering, and the delaying the first trigger comprises:
adding the first trigger to the delayed trigger queue, and changing a triggering time of the first trigger from the first moment to a second moment, wherein the second moment is later than the first moment.

6. The method according to claim 5, further comprising:
adding a second trigger that is set by a second application program to the normal trigger queue, wherein an attribute of the second trigger is a second attribute different from the first attribute, and a triggering policy of the second trigger is normal triggering; and
when a triggering time of the second trigger arrives, delaying, based on at least one of a status of the terminal device or a current operation status of the user, delivering the second trigger to the second application program.

7. The method according to claim 6, wherein the delaying delivering the second trigger to the second application program comprises:
migrating the second trigger from the normal trigger queue to the delayed trigger queue.

8. The method according to claim 1, wherein the characteristic information of the first application program comprises at least one of characteristic information of historical behavior of the first application program or a type of the first application program; and the characteristic information of the historical behavior of the user comprises an operation record of the user.

9. The method according to claim 1, wherein the first trigger is an alarm, a timer, or a job information (JobInfo) object.

10. A terminal device, comprising:
a memory storing a computer program; and
a processor, coupled with the memory, configured to execute the computer program to:
determine a first trigger that is set by a first application program on the terminal device, wherein the first trigger is set to trigger a first task at a first moment;
determine a triggering policy of the first trigger based on an attribute of the first trigger, wherein the triggering policy is normal triggering, delaying triggering, or accelerating triggering; and
when the triggering policy of the first trigger is normal triggering, executing the first trigger at the first moment to trigger the first task; or
when the triggering policy of the first trigger is delaying triggering, delaying the first trigger, so that the first task is triggered at a moment later than the first moment;
when the triggering policy of the first trigger is accelerating triggering, accelerating the first trigger, so that the first task is triggered at a moment earlier than the first moment, wherein
the attribute of the first trigger is determined based on at least one of characteristic information of historical behavior of a user, characteristic information of the first application program, or characteristic information of the first trigger.

11. The terminal device of claim 10, wherein the processor is further configured to delay, based on at least one of a status of the terminal device or a current operation status of the user, delivering the first trigger to the first application program.

12. The terminal device of claim 11, wherein the status of the terminal device comprises at least one of resource usage, a battery level, a work mode, a network connection status, a data transmission status, a name of a foreground application program, a type of the foreground application program, a name of a background application program, or a type of the background application program of the terminal device; and the work mode of the terminal device is a sleep mode or a wakeup mode.

13. The terminal device of claim 10, wherein the processor is configured to change a triggering time of the first trigger from the first moment to a second moment, wherein the second moment is later than the first moment.

14. The terminal device of claim 10, wherein the terminal device maintains a normal trigger queue and a delayed trigger queue; and when the attribute of the first trigger is a first attribute, the triggering policy of the first trigger is delaying triggering, and the processor is configured to add the first trigger to the delayed trigger queue, and change a triggering time of the first trigger from the first moment to a second moment, wherein the second moment is later than the first moment.

15. The terminal device of claim 14, wherein the processor is configured to:
add a second trigger that is set by a second application program to the normal trigger queue, wherein an attribute of the second trigger is a second attribute different from the first attribute, and a triggering policy of the second trigger is normal triggering; and
when a triggering time of the second trigger arrives, delay, based on at least one of a status of the terminal device or a current operation status of the user, delivering the second trigger to the second application program.

16. The terminal device of claim 15, wherein the processor is configured to:
migrate the second trigger from the normal trigger queue to the delayed trigger queue.

17. The terminal device of claim 10, wherein the characteristic information of the first application program comprises at least one of characteristic information of historical behavior of the first application program or a type of the first application program; and the characteristic information of the historical behavior of the user comprises an operation record of the user.

18. A non-transitory computer-readable storage medium, storing instructions which, when executed by a computer device, cause the computer device to perform the following operations:
- determining a first trigger that is set by a first application program on a terminal device, wherein the first trigger is set to trigger a first task at a first moment;
- determining a triggering policy of the first trigger based on an attribute of the first trigger, wherein the triggering policy is normal triggering, delaying triggering, or accelerating triggering; and
- when the triggering policy of the first trigger is normal triggering, executing the first trigger at the first moment to trigger the first task; or
- when the triggering policy of the first trigger is delaying triggering, delaying the first trigger, so that the first task is triggered at a moment later than the first moment;
- when the triggering policy of the first trigger is accelerating triggering, accelerating the first trigger, so that the first task is triggered at a moment earlier than the first moment, wherein
- the attribute of the first trigger is determined based on at least one of characteristic information of historical behavior of a user, characteristic information of the first application program, or characteristic information of the first trigger.

\* \* \* \* \*